(12) United States Patent
Phin

(10) Patent No.: US 11,703,312 B2
(45) Date of Patent: Jul. 18, 2023

(54) CONNECTOR ASSEMBLY EVALUATION TOOL AND METHOD

(71) Applicant: Paragon Inspection Limited, Dundee (GB)

(72) Inventor: David Sutherland Phin, Dundee (GB)

(73) Assignee: Paragon Inspection Limited, Dundee (GB)

( * ) Notice: Subject to any disclaimer, the term of this patent is extended or adjusted under 35 U.S.C. 154(b) by 593 days.

(21) Appl. No.: 16/641,068

(22) PCT Filed: Aug. 22, 2018

(86) PCT No.: PCT/GB2018/052380
§ 371 (c)(1),
(2) Date: Feb. 21, 2020

(87) PCT Pub. No.: WO2019/038538
PCT Pub. Date: Feb. 28, 2019

(65) Prior Publication Data
US 2020/0292292 A1    Sep. 17, 2020

(30) Foreign Application Priority Data
Aug. 23, 2017   (GB) .................................... 1713556

(51) Int. Cl.
*G01B 5/14*     (2006.01)
*G01B 3/30*     (2006.01)
(Continued)

(52) U.S. Cl.
CPC ................ *G01B 5/14* (2013.01); *F16L 55/00* (2013.01); *G01B 3/30* (2013.01); *G01B 3/38* (2013.01); *G01M 3/00* (2013.01); *G06K 7/10297* (2013.01)

(58) Field of Classification Search
CPC ........ F16L 55/00; F16L 2101/10; G01B 3/30; G01B 3/38; G01B 3/12; G01B 3/22;
(Continued)

(56) References Cited

U.S. PATENT DOCUMENTS 3,802,084 A * 4/1974 Fortado, Jr. ............ G01B 5/143
33/613
4,505,045 A * 3/1985 Stocker ................ G01B 5/0032
33/655
(Continued)

FOREIGN PATENT DOCUMENTS

CH          245115 A      10/1946
CN       203443519 U      2/2014
(Continued)

OTHER PUBLICATIONS

International Preliminary Report on Patentability issued for Application No. PCT/GB2018/052380, dated Feb. 25, 2020, 11 pages.
(Continued)

*Primary Examiner* — Yaritza Guadalupe-McCall
(74) *Attorney, Agent, or Firm* — Meunier Carlin & Curfman LLC

(57) ABSTRACT

The invention relates to an evaluation tool and method for inspecting the integrity of any physical industry connections (hereinafter fittings). The tool comprises a first component (21) provided with a recess (23) to facilitate its engagement with a fitting to be evaluated (see FIG. 10); and a second component (20) connected to, and moveable relative to, the first component (21). Movement of the second component (20) relative to the first component (21) establishes a measurement between two surfaces (32, 33 in FIG. 10) of a fitting (34) to be evaluated, e.g. between an adjustable ferrule or nut (32) and a fixed part (33) of a fitting (34). The measurement is directly (27, 28), or indirectly, indicative of one or more predetermined connection conditions (e.g. over
(Continued)

or under tightening of the adjustable component). The predetermined connection conditions may be read directly from the tool, remotely via an electronic device, or by late cross-referencing against entries in a database.

25 Claims, 34 Drawing Sheets

(51) Int. Cl.
*F16L 55/00* (2006.01)
*G01B 3/38* (2006.01)
*G01M 3/00* (2006.01)
*G06K 7/10* (2006.01)

(58) Field of Classification Search
CPC .. G01B 3/04; G01B 3/50; G01B 5/14; G01M 3/00; G06K 7/10297
See application file for complete search history.

(56) References Cited

U.S. PATENT DOCUMENTS

| | | | | |
|---|---|---|---|---|
| 5,020,401 A | * | 6/1991 | Jiles | B23B 5/167 144/205 |
| 5,050,310 A | * | 9/1991 | Jiles | B23B 5/167 D10/64 |
| 5,363,562 A | * | 11/1994 | Schmidt | G01B 3/306 33/784 |
| 5,444,921 A | | 8/1995 | Milina | |
| 5,459,936 A | * | 10/1995 | Stange | G01B 3/38 33/529 |
| 5,465,498 A | | 11/1995 | Lycan | |
| 5,768,792 A | * | 6/1998 | Raab | G05B 19/4207 33/529 |
| 6,047,606 A | * | 4/2000 | Sibole | G01B 3/30 73/865.8 |
| 6,077,000 A | * | 6/2000 | Gibbons | B23B 47/28 33/645 |
| 6,490,804 B1 | * | 12/2002 | Colson | G01B 5/14 33/833 |
| 7,511,210 B2 | * | 3/2009 | May | G10D 13/16 84/413 |
| 10,976,145 B2 | * | 4/2021 | Feldman | G01B 5/18 |
| 2002/0162238 A1 | * | 11/2002 | Bakke | G01B 3/34 33/501.45 |
| 2007/0094880 A1 | | 5/2007 | Sherlock et al. | |
| 2008/0173156 A1 | * | 7/2008 | May | G10D 13/02 84/413 |
| 2015/0096183 A1 | * | 4/2015 | Laflen | G01B 3/26 33/531 |
| 2015/0362336 A1 | | 12/2015 | Cook | |
| 2018/0172417 A1 | * | 6/2018 | Umbricht | G01B 3/30 |
| 2020/0292292 A1 | * | 9/2020 | Phin | G01M 3/00 |
| 2020/0309498 A1 | * | 10/2020 | Feldman | G01B 5/18 |

FOREIGN PATENT DOCUMENTS

| | | | | |
|---|---|---|---|---|
| CN | 108225199 A | * | 6/2018 | ............. G01B 11/06 |
| EP | 2610579 A1 | | 7/2013 | |
| EP | 3336483 A1 | | 6/2018 | |
| JP | H03152401 A | | 6/1991 | |
| WO | 2017023735 A1 | | 2/2017 | |

OTHER PUBLICATIONS

Search Report issued for Application No. GB1813668.9, dated Feb. 19, 2019, 2 pages.
International Search Report and Written Opinion issued for Application No. PCT/GB2018/052380, dated Nov. 14, 2018, 14 pages.

* cited by examiner

CONNECTOR ASSEMBLY EVALUATION TOOL AND METHOD

CROSS REFERENCE TO RELATED APPLICATIONS

This application claims priority to and is a United States National Phase Patent Application of International Patent Application Number PCT/GB2018/052380, filed on Aug. 22, 2018, which claims priority to GB Patent Application No. 1713556.7, filed on Aug. 23, 2017, both of which are incorporated by reference herein.

FIELD OF THE INVENTION

The present invention relates to an evaluation tool and method for inspecting the integrity of any physical industry connections including, but not limited to mechanical joints, mechanical unions, pipe connection fittings, tube connection fittings and the like (hereinafter collectively referred to under the general term "fitting") to determine connection condition without disassembly of the fitting.

BACKGROUND

Mechanically attached fittings are used in industry to connect many various components including pipe, or tube etc. The connection may be between a pipe end to either another pipe end or to another portion of a system. It is desirable that such mechanically attached connections are capable of maintaining mechanical strength to hold the connection together and maintain a fluid tight seal where appropriate. The mechanical connection may be under various conditions during service including under vibration, stress and pressure for example. Fluids may include hydrocarbons, high pressure gas, natural gas liquids, chemicals gas, liquid and any variation or combination thereof. For simplicity and clarity, the term 'fitting' as used herein is intended to be all inclusive of other terms, for example coupling, connection, union, fitting, joint and so on, that could alternatively be used to refer to a mechanically attached connection. Furthermore the term 'pipe' may refer to many types of components connected by means of a mechanical connection, including small bore tubing.

Fluid systems typically use mechanically attached connections to interconnect pipe ends to each other and to flow apparatus which may control flow, contain flow, regulate flow, measure characteristics of the fluid or fluid flow, or otherwise influence the fluid within the fluid system. The term 'mechanically attached connection' as used herein means any connection for or in a fluid system that involves at least one connection that is held in place by mechanically applied force, stress, pressure, torque, or the like, such as, for example, a threaded connection, a clamped connection, a bolted or screwed together connection and so on.

Pipe unions, fittings or connections are secured to an end of a section of pipe using a wide variety of designs including but not limited to single ferrule and multi ferrule fittings, various clamping arrangements using elastomeric seals, gripping rings, nuts and so on.

Two sections of a joint, pipe or a pipe and valve, meter, flow control apparatus and so on are commonly connected together using a union. Other fittings such as T-portions and elbows are used to adapt the shape of the pipe and subsequent pipework or fluid circuit and the flow path through the pipe or fluid circuit to match the given requirements. The integrity of any connection between two sections of pipe or a section of pipe and a pipe union or fitting depends on the correct fitment of the union or fitting to the section of pipe. Once the union or fitting is attached to the pipe and the resulting assembly completed it is however difficult to assess whether the connection has been made properly after first or subsequent assemblies. Connectors may also be affected by environmental effects such as the fitting or pipe becoming loose or detached due to vibration, pressure, stress, expansion and contraction, or any other environmental effect/s.

One example of a mechanically attached connection involves a pipe fitting apparatus, such as, for example, a collet or one or more ferrules, which may be installed on an outer surface of a pipe for assembly with a fitting. In a conventional ferrule type fitting, a fitting body and nut may be assembled together and tightened (or pulled up) to install the ferrule or ferrules in gripping and sealing engagement with the pipe by plastically deforming the ferrule or ferrules on the pipe. The installed ferrule or ferrules grip the pipe and provide a fluid tight seal which may meet pressure and vibration requirements.

Ferrule type fittings are well known in industry and may include a threaded coupling nut, a threaded coupling body and one or more ferrules that fit inside the coupling nut. A cylindrical pipe such as, for example, a tube end, is slid into the coupling body with the ferrules closely surrounding the outer wall of the tube end. When the coupling nut is installed onto the threaded end of the coupling body (or vice versa when the coupling body includes female threads), an axial force is applied to the ferrule or ferrules which causes the surfaces of the ferrule and body to engage to produce a swaging action thereby causing a displacement of portions of each ferrule, causing the ferrules to tightly grip the outer wall of the tube end. In many applications the fitting may be assembled with the use of simple hand tools such as wrenches. Some types of fittings are designed to be installed, disassembled and reassembled many times as required as an advantage over other types of connection such as welding etc.

Connector Problems

A connection may be assembled incorrectly in many ways dependent upon the connection type. Connectors may be incorrectly tightened, over tightened, or under tightened. Connectors may be connected with wrong types of connection components connected together. Connectors may be assembled incorrectly with metric and imperial type components connected together. Connectors may also be assembled incorrectly with different manufacturers connection components incorrectly assembled together.

Proper connection between the pipe and the union or fitting may depend on the pipe being secured in the fitting or union with the correct number, position, location, orientation and type of fitting components assembled and tightened correctly. Proper connection may also depend upon following the manufacturers recommendations for disassembly and re-make of the connector being followed by the assembler and/or general quality of the tooling and marking methods being used.

Some fitting manufacturers suggest initially tightening the nut to finger tight and marking the nut at the 6 o'clock position, and tightening the nut a further 1¼ turns for example. The problem with such instructions is that finger tightness is an arbitrary condition and a marking tool may not be used to mark a nut and fitting accurately enough when a fitting is being installed. Furthermore, even if the manufacturers' installation instructions are followed, the tightness of a fitting may be inconsistent because of differing user interpretations of finger-tightness and 1¼ turns Access to the fitting joint may also be restricted making it difficult to access the fitting, a number of smaller turns of the nut may be required making it difficult to determine the number of turns and final position, of the nut. If a fitting is overtightened the tube and the ferrule/s which help provide the seal may be damaged. Such damage is not visually apparent, and may not be undone. If the tightening force between the connector and the nut is less than manufacturers recommendations the amount of swaging of the ferrule/s is less than optimal and the seal between the tube and the fitting may leak. If the tightening force between the connector and the nut is greater than manufacturer's recommendations, the tube and/or the front ferrule may excessively deform in a manner that prevents a leak tight seal between the tube and the fitting. Excessive deformation of the tube and/or ferrule may render removal of the tube from the fitting difficult or impossible. When the tightening force between the nut and the connector is within manufacturer's recommendations, the amount of swaging between the ferrule and the tube is optimum and the fitting parts provide a leak tight seal around the tube, and between the ferrule and the nut.

Another known method of tightening a fitting to an optimum condition during assembly includes use of a fixed dimension go/no-go gauge that fits between the nut and the connector during initial assembly. However, gauges are often unavailable or improperly used. Furthermore the gauge is only to be used for initial assembly in accordance with manufacturer's instructions as subsequent reassembly instructions require the user to move the nut very slightly past the initial position, rendering the gauge useless after initial assembly. These types of gauges may not determine any other condition of the fitting including internal features and may not be used for assessment of fitting tightness after assembly or during service. Furthermore if a fitting is overtightened there is no means to determine this condition unless the fitting is disassembled, if the fitting has been severely overtightened and the condition is extreme, the fitting components may be difficult to remove from the pipe. Visual inspections are normally performed. Visual inspection of an installed fitting will not indicate whether the fitting assembly is loose, tight or installed correctly. Visual inspections also do not provide adequate corroboration that a fitting is leak tight, proper tightening procedures were followed, or the internal components were correctly installed.

A loose fitting will commonly result in a reduction of the pressure rating of the fitting or fluid leaking from the pipe. Incorrect ferrule fitment, missing ferrule/s, over tightening of the nut, under tightening of the nut, poor thread engagement and mixing different component types or differing manufacturers components may also result in a reduction of the pressure rating, fluid leaks or the pipe/tube becoming detached from the fitting.

Pipe connections may be assembled with a ferrule or ferrules. Pipe connection ferrules or ferrules may be missing, incorrectly fitted within a body of the fitting, additional ferrules incorrectly added, one or more ferrules may be reversed the wrong way around, or any other combination of the above. Incorrect assembly and incorrect tightening of the connector may occur by virtue of the assembler failing to properly assemble the connector correctly, mixing the wrong type components or components from different manufacturers, failing to tighten the connector sufficiently, or over tightening the connector for example. Incorrect assembly and failing to tighten the connector assembly correctly etc may be classed as human factor errors. Some industries have a high error rate for connector assembly and tightening, with approximately 25% of connectors incorrectly installed which may be attributed to human factor errors. Vibration effects, pressure, temperature variations and other atmospheric conditions may also cause the connector to become loose or the pipe to become detached from the connector. At present a percentage visual inspection check is performed during service. There is no means in industry to determine some types of fitting condition such as if a fitting assembly has been assembled with the correct number, type and position, of internal components in the correct orientation without disassembly of the connector. There is also no means to determine if a fitting has been previously tightened correctly within manufactures tolerances or if a fitting assembly has been re-made and under or over tightened outside manufacturers tolerances. Some types of connectors may require disassembly procedure steps such as, isolation, shutdown, depressurise, disassembly, visually inspect, record, reassemble, flush, pressure test, return to service, produce report, update of a database etc. which increases user costs in addition to any leaks from the system which may potentially be hazardous.

For example, in some industries when a fitting fails plant shutdown may occur, if undetected a failure may be catastrophic. Statistics indicate that 20% of all reported hydrocarbon leaks offshore in the UK were related to 'instruments', i.e. they are regarded as small bore tubing related. Of these, 11% of all reported leaks were classed as major severity events. Complete fracture of a section or parting of a small-bore tubing coupling may potentially rapidly escalate to a major release in just a few minutes. Incorrectly fitted equipment is the most widespread operational cause (human factor issues) where operational failures are reported. While regular inspection is therefore necessary, the number of fittings in service makes this a very significant challenge. The principle methods of inspection are currently visual inspection and percentage disassembly checks of fitting lines to check fitting internal assembly. Disassembly has significant cost implications due to issue of permits to work, isolation of plant, flushing of systems, disassembly of fittings (normally 10% in a line) visual inspection, reassembly, pressure testing etc and requires plant to be shut down during inspection.

Connector Measurement Problems

In many applications, proper assembly of fittings is ensured by controlling axial advancement of the nut toward the fitting body. The fitting body may be installed on a pipe or a pipe installed in a fitting body and the nut is tightened to a finger tight position, Then, the nut is tightened a specified number of turns (one and a half turns, for example) to axially advance the nut a controlled distance and ensure proper pull-up of the fitting. Axial advancement of the nut may seem a simple measurement but has previously proved impossible due to the factors below.

Measurement may be done in a variety of different ways. When physically reading a uniformly divided straight or circular graduated measurement scale the degree of precision of the apparatus may be determined by finding the smallest division on the instrument. To increase precision, an apparatus that measures to smaller divisions will lower the margin of error.

The allowable tolerance of some types of fittings between initial assembly and reassembly may be less than 0.08 mm. This is impossible to measure by eye with simple marked gauges that exist in industry. The next common instrument for greater accuracy widely used in industry is a vernier calliper type instrument. A Vernier calliper is an apparatus that allows the user to measure more precisely than could be done unaided when reading a uniformly divided straight or circular measurement scale. In metric scales, the units used for calibration are millimetres. A vernier calliper outputs measurement readings in millimetres (mm) and is precise up to 2 decimal places (E.g. 1.23 mm).

Vernier callipers commonly used in industry provide a precision to 0.01 mm (one hundredth of a millimetre) which would initially appear to be able to measure the assembly condition. However for accurate measurement many standards require the 10-to-1 rule, which states that in gages with analogue or digital readouts, the measuring instrument should resolve to approximately one-tenth of the tolerance being measured. For example, this means if the allowable tolerance for a correctly tightened connector is 0.08 mm or less, the smallest increment displayed on the gage should be 0.008 mm or less (three decimal places or one thousandth of a millimetre). A gage that only reads to two decimal places may not resolve closely enough for accurate judgments. Furthermore the precision of the measurement may be affected by limitations in either of the two basic requirements. The accuracy of the instrument and the proper location of the gauging points which determine the dimension being measured on the physical part. A calliper's jaws must be forced into contact with the part being measured the amount of force used affects the indication. A consistent, firm touch is required. Too much force may result in an under indication, too little force may give insufficient contact and an over indication. A calliper must also be properly applied against the part in order to take the desired measurement. For example, when measuring the thickness of a flat surface a vernier calliper must be held at right angles to the piece, round or irregular objects such as connectors create additional problems. Accuracy of measurement when using a calliper is highly dependent on the skill of the user. Many additional factors may reduce accuracy or precision and increase the uncertainty of the measurement result. Some of the most common are:

Environmental conditions—changes in temperature or humidity may expand and contract materials as well as affect the performance of measurement equipment. Poor lighting, difficult to access areas, restrictions due to geometry of the connector types, many connectors closely bunched together, connectors at difficult to access heights or positions etc. Access difficulties etc may lead to the apparatus not being positioned correctly or the user not being able to read the display correctly.

Inferior measuring equipment—equipment not accurate enough to measure the desired feature.

Poor measuring techniques—equipment not correctly aligned due to restricted access to the area during measurement, restriction due to geometry or position, of connector when in service, equipment not designed to fit measurement areas, equipment incapable of reading to an accurate enough level, operator eyesight differences, poor line of sight to display etc.

Fitting type and location conditions may lead to a variety of complex measurement problems. Many fitting features may also lead to measurement errors, for example, the contact point/s to be measured may be small features, may be in a small narrow gap or opening, may be at an opposite or extreme ends of the connector body and nut, may also be from a different point, on a differing shape connector component, restrictions to the measuring apparatus reaching, contacting, and being aligned correctly with the point/s may be caused by irregular curved surfaces, threads, radiused corners, features to be measured not parallel to each other, features to be measured not aligned with each other, at differing positions, access restricting the alignment of the measuring apparatus, or access to view the scale alignment correctly of the measuring apparatus etc. any number or combination of differing conditions for each connector may occur.

The measuring apparatus not being accurate enough, for any small dimensional changes by the adjustment of the connector nut is one aspect of the problem. Improperly located dimensions may often have a greater effect on correctness of dimensional measurements than errors due to insufficient indicating accuracy.

As may be seen from the numerous difficulties encountered it has previously proved impossible to gain an accurate method and apparatus to measure the very small dimensional changes that determine fitting condition when fitted or in service without the disassembly and visual inspection practices which are currently used by industry.

The Solution

The inventor of the present invention has developed an apparatus for and method of assessing the integrity of a mechanical connection between a pipe and another fluid flow coupling or element such as a pipe fitting, the invention may display the connector condition information directly, to reduce human factor errors, and reduce human inputs.

For ferrule type connectors information such as an over-tightened, under tightened or a finger tight connector may be detected and/or assessed, additional, missing or incorrectly installed ferrule/s, reversed ferrule/s or ferrule/s positioned incorrectly may also be detected and/or assessed, without the need to disassemble the connector, displaying the condition of mechanical connection automatically reducing inspection time and human factor errors.

Many differing types of mechanical connection may also be assessed for specific connection conditions. The apparatus and method may determine if a connector or connector component is installed correctly in accordance with manufacturer's recommendations after assembly and during service life without disassembly.

Embodiments of methods and apparatus for inspection and evaluation of pipe connectors installed onto a pipe will be described herein in an exemplary manner for causing two ferrules of a conventional pipe fitting to grip a pipe end at a desired axial location. However, this is for purposes of illustration and explanation and should not be construed in a limiting sense. Those skilled in the art will readily appreciate that the inspection methods and apparatus described herein may be used to inspect and evaluate single ferrules onto pipe ends, and further may be used to inspect and evaluate ferrules onto cylindrical members other than just pipe ends. Further, the inspection and evaluation operation may take place on any connector type, used in any industry, for example, hose connections, instrument connections, gas connections, medical device connections, hydraulic connections etc, at any site where a fitting body or other type connector occurs.

The apparatus allows measuring a changeable characteristic feature of the fitting (such as a nut) relative to a fixed characteristic feature of the fitting (such as a fitting body), a variety of fitting condition(s) may be determined. Proper fitting component quantity, type, orientation, position, mixed metric and imperial fitting components, and mixed components from different manufactures, may be detected. If the total axial length of the components of the fitting, assembled in the correct order, in the correct orientation is known (by pre-setting the apparatus on known calibration pieces for example). The detection of differing axial lengths may indicate that too many components are present, the wrong type of components are present, the orientation of one or more components is incorrect, the position, of one or more components is incorrect, the connector has not been tightened correctly and any other condition relevant to the connector type.

When a potential problem is detected, for example, by detecting a deviation from the expected axial length the apparatus may compare the measured axial length with the predetermined axial lengths of differing conditions of known incorrect assemblies to identify the type of incorrect assembly. The apparatus may then display the fitting condition reducing further human factor errors in reading, recording, storing, reporting and uploading information.

Fitting condition and severity may be easily determined by accurate location and positioning of the apparatus, using a novel method of measurement which is simple but highly accurate, using a display method which displays a range of conditions rather than a numerical display, simplifying the reading of the apparatus for the user, simplifying or eliminating the recording of numerical information, simplifying input of information to a database for the user, etc. Apparatus features may include any shape, configuration or combination of features, to reduce contact or interference from fitting features that may interfere with the measurement, to firmly grip the connector during measurement, to reduce apparatus movement during measurement, to allow an easy to read and understand display. Highly accurate measurement may be by any means, including, but not limited to, by using position, rotation angle, or circumferential distance, or arc length travelled, of the apparatus piece/s. Changes in accuracy and/or tolerances may be by any means, including, but not limited to, being able to adjust the tolerance and sensitivity of the apparatus, by varying the, shape, diameter, length, and/or thickness, of any apparatus components, by replacing various apparatus component/s, covering a range of connector conditions, and varying sensitivity levels for each condition, in one or more apparatus component/s, if required, which may be replaceable, and also may be pre-set, pre-setting the apparatus component may be to the fitting manufacturers tolerances, the apparatus may be easily checked and verified by the user with calibration reference piece/s. The apparatus may be small, portable, handheld, easy to use, intrinsically safe, easily understood, may reduce human factor errors in measurement, recording and downloading of information. The apparatus may reduce human factor errors in pipe connection installation, may allow inspection of connections during service, may allow regular inspection of high risk connections subject to vibration etc, without disassembly, may reduce leaks such as hydrocarbon leaks, and may improve safety where connectors are used.

Apparatus

In accordance with a first aspect of the present invention there is provided a tool for evaluating the connection condition of a mechanical fitting comprising:
(i) a first component shaped to facilitate its engagement with a fitting to be evaluated; and
(ii) a second component connected to, and moveable relative to, the first component;
wherein a relative movement between the first and second components establishes a measurement between two surfaces of a fitting to be evaluated, said measurement being directly or indirectly indicative of one or more predetermined connection conditions.

It is an advantage of the present invention that the apparatus may be accurate, repeatable, portable, handheld, used in confined areas, made intrinsically safe for hazardous areas, may also be used with no electrical power requirements if required, may produce a simplified display of condition and may also be used for many differing configurations of connector type.

It is also an advantage of the present invention that the apparatus may be used in-situ, on-site, or on installed connectors. The need to isolate, shut down, disassemble, inspect, re-assemble, flush, pressure test and return to service as per current industry practice for some types of connectors may not be required.

It is also an advantage of the apparatus that no current apparatus or method exists in industry to inspect installed connectors to determine conditions without disassembly.

It is also an advantage that connector condition may be displayed, reducing human factor errors when using the apparatus, recording the information, and/or storing or uploading the information.

It is also an advantage of the apparatus that the number of steps to record dimensional information, and/or update a database, may be reduced utilising a display of connector condition.

It is also an advantage of the apparatus that the installation and/or installer competency may be checked.

It is also an advantage of the apparatus that connector condition may be determined immediately by the user, which may be critical in the case of a leak, allowing the user to take fast corrective action, for example shut down, or isolation, of the faulty connector.

It is also an advantage of the apparatus that the current rate of human factor errors (25%) in some industries may be reduced, leading to safer practices, reduced costs, and reduced leaks such as hydrocarbon leaks.

It is also an advantage of the apparatus that only incorrect fittings may be disassembled, corrected, and reassembled, thus avoiding disassembly of a correctly assembled fittings, which occurs during the current industry method of percentage checks. Disassembly of correctly assembled fittings may lead to incorrect reassembly due to human factor errors.

Method

In accordance with a second aspect of the present invention there is provided a method of evaluating the connection condition of a fitting comprising:
(i) providing a tool in accordance with the first aspect;
(ii) engaging the first component with the fitting to be evaluated proximate fixed and adjustable fitting parts thereof;
(iii) effecting relative movement between the first and second components until respective surfaces thereof each contact surfaces of said fixed and adjustable fitting parts; and
(iv) establishing a measurement between said surfaces of said fixed and adjustable fitting parts;
wherein said measurement is directly or indirectly indicative of one or more predetermined connection conditions.

The method may include the step of comparing the apparatus information, with a correctly installed and tightened pipe fitting, with the apparatus information, from an incorrectly installed and tightened pipe fitting/s.

Descriptions of exemplary methods or processes are not limited to inclusion of all steps as being required in all cases, nor is the order that the steps are presented to be construed as required or necessary unless expressly so stated.

The information from the apparatus may vary with a correctly installed and tightened, or re-made and tightened fitting, the variation may determine an acceptable tolerance and may allow the user to determine, if a fitting has been made, more than one time, and allow pre-set tolerances to be used.

The information from the apparatus may vary with correctly installed and tightened, or re-made conditions, allowing the apparatus to have an acceptable tolerance range, other conditions may also have a tolerance range. Pre-set tolerances may be used to set the apparatus and/or to determine condition severity.

The condition of a pipe fitting indicating a specific event which may occur in the pipe fitting may be automatically displayed by pre-marking and/or pre-setting the apparatus with known conditions, and/or severity of condition, of connector, specific to the connector type; utilising the apparatus, to obtain a reading, of a connector variable, and/or severity; comparing the reading obtained, with the pre-marked, pre-indicated, or pre-set condition; and supplying a visual indication which displays the pre-determined condition automatically. The display produces a credible technical effect by giving a visual indication automatically about the condition prevailing in the connector, indicates a specific event which may occur in the apparatus, displays a pre-determined condition making it easier for the user to quickly locate the source of a leak or possible leak within a system of connections, reduces human factor errors and inspection time by producing a display easier to interpret, elimination of the requirement to record dimensions and simplifying information input to a database.

The display may replace a normal dimensional display which may require a dimension to be recorded and assessed at a later time, against drawings, reference tables, tolerances etc to determine condition. The display may eliminate the human requirement to record dimensions and refer to additional information. The display may assist human activities by simplifying the reading of the display, to a predetermined condition and severity reading, and input if required of the condition into a database from a pre-determined range of conditions. Normal input of information into a database requires manually inputting dimensions etc. The display may reduce human factor errors, which are a major contributor to incorrectly installed connectors and connector leaks. A simplified display may reduce training time, for personnel prior to apparatus use, saving associated training time and simplifying training. The display may provide connector condition information more accurately and with a faster speed, reducing human factor errors due to misreading the device. The display of all connector conditions may be contained within, and shown by, one rotation (360 degrees) or less, of a component, thus simplifying the display and further reducing human factor errors. Alternatively the device may rotate past 360 degrees with a number of turns, and may be displayed, and/or measured.

Many connector conditions may be pre-programmed electronically and stored on the apparatus such that a visual, audible or any other means of detection may be displayed. The inspection apparatus may be connected to an electronic apparatus or an output to notify the user audibly or visually of the condition.

The optional features of the first aspect of the present invention may be incorporated into the second aspect of the present invention and may be incorporated into the third aspect of the present invention in any combination.

BRIEF DESCRIPTION OF THE DRAWINGS

Embodiments of the present invention will now be described by way of example only and with reference to the accompanying drawings, in which these and other inventive aspects and features of the present disclosure will become apparent to one skilled in the art to which the present invention relates upon consideration of the following description of the exemplary embodiments with reference to the accompanying drawings, in which.

Figure 1:
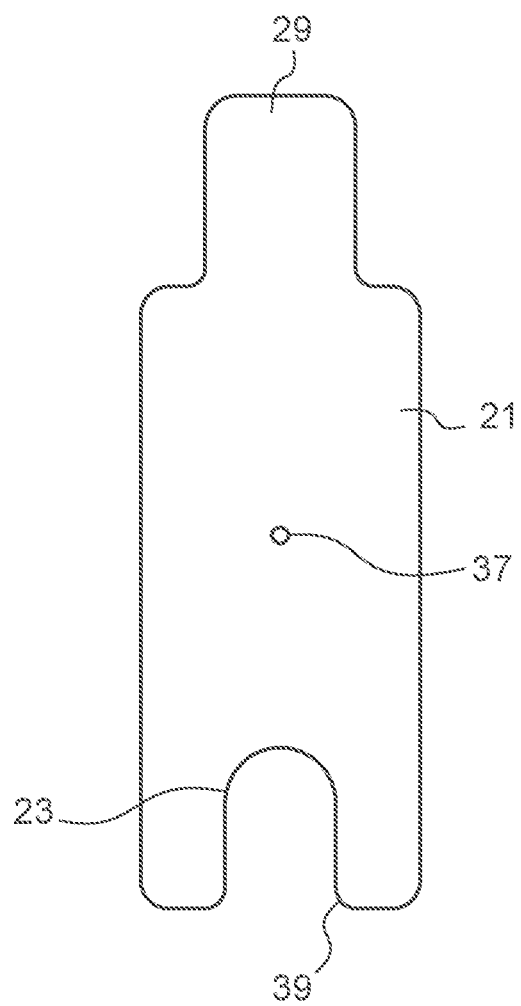
FIG. 1 illustrates a first component of an exemplary embodiment of the apparatus according to the present invention.

One aspect of the apparatus is that the apparatus may indicate position, or changes of a moving apparatus component. The apparatus component 20 (FIG. 2) may be of any shape or configuration, for example only (FIG. 18), that may change position, or move, rotate, in an arc, or in an offset manner (FIG. 16), which may move the position, of the component 20 to come into contact with a desired point on the connector moveable characteristic 32, or connector fixed characteristic 33, (FIG. 10) (FIG. 10A-F) (FIG. 16) (FIG. 17)

Another aspect of the apparatus is that the position change may be more accurate than conventional measuring equipment. For example only, if component 20 (FIG. 16) position, was changed, for example, by rotation and was set to move axially, along an axial distance (or range of distances) L1 (FIG. 9B) by 1 mm each 360 degrees rotation (by the pre-determined shape of component 20 or any other means), then each degree of rotation (360 units) would represent $\frac{1}{360}^{th}$ of a millimetre (0.0027 mm). A vernier calliper normally measures in $\frac{1}{100}^{th}$ of a millimetre (0.01 mm), therefore by a method of measuring position, in this case, the position, or rotation angle, the apparatus is made more sensitive, furthermore digital measurements of position, or rotation, using electronic apparatus, such as encoders, for example, are normally in a scale of 0.1 degrees. Therefore for 1 mm over 360.0 degrees (3600 units) then each 0.1 degrees would represent $\frac{1}{3600}^{th}$ of a millimetre again more sensitive than a typical measuring apparatus such as a vernier calliper.

It will be appreciated that component 20 may change position, be moved, and/or monitored by any means and may be of any shape, component 20, may also have a substantially flat edge, or an edge with a changeable shape, which may extend the full, or partial length, of the perimeter, or periphery. Component 20 may also be set to move, by deflection, such as pressing, shaping, or distorting prior to use. Component 20 may also be set to change position, by a shaped component 44 (FIG. 16), which may, take a wide variety of different forms, or be of any type of configuration, to allow 20 to change position, axially, along an axial distance (or range of distances) L1. Another component, such as, 43 (FIG. 10 C), or any configuration, of component 20, (FIG. 18) may also be used, which may also, take a wide variety of forms, or be any type of configuration. Component 20 may also change position across, along, internally, externally, or within any portion of the connector or connector pieces depending upon connector type and configuration, to determine the required information.

A further aspect of the apparatus is that, it may be any number of components, the components may be any configuration, designed to fit, the connector, and/or connector secondary piece/s, and/or pipe/s, and/or each other, the components may be replaceable, and may be connectable to each other.

A further aspect of the apparatus is that the angle of position, or rotation, if utilised, may further be calculated and converted into movement along the circumference, periphery or arc, of the component and displayed. Therefore the actual distance that an apparatus component may move, such as, for example, the circumferential movement of part 20 may be determined and used further. For example only, if the circumference of part 20 was 200 mm then a 1 mm axial movement could be divided by a circumferential movement of 200 mm with each mm of circumferential movement representing $\frac{1}{200}^{th}$ of a millimetre of axial movement which would again be more sensitive than a typical calliper ($\frac{1}{100}^{th}$ of a millimetre).

A further aspect of the apparatus, is that the movement of the apparatus, may be measured more accurately, than conventional measuring methods.

A further aspect of the apparatus is that the sensitivity may be increased by increasing the circumference, radius, arc, length or diameter of the component/s that change position.

In accordance with an aspect of the present invention there is provided an apparatus comprising an apparatus comprising a first portion and at least a second portion, being moveable between a fixed characteristic of the connector and a changeable characteristic of the connector wherein the apparatus is located at the pipe, tube, connector or connector secondary portion (nut or other secondary portion) and the position is changed, or moved, until contact is made, the apparatus may indicate connector make-up, tightness, condition and severity.

A further aspect of the apparatus is that the apparatus may be used in any position, on any connector, or pipe, including any opening, aperture, space, or gap between the connector components.

It is an advantage of the present invention that the apparatus may be handheld, used in confined areas, made intrinsically safe for hazardous areas, may be used with no electrical power requirements, and may if required, produce a simplified display of condition, and/or severity, and also may be used for many differing configurations of connector type.

It is also an advantage of the present invention that the apparatus may be used in-situ, on-site, on installed connectors without the need to isolate, shut down, disassemble, inspect, re-assemble, flush, pressure test and return to service as per current industry practice.

It is also an advantage of the apparatus that no current method or equipment exists in industry to inspect installed connectors to determine conditions without disassembly.

Apparatus Operation

A connector may be assembled on the pipe, or the pipe inserted into the connector, to complete assembly, the connector may be tightened. Tightening of the connector may be, by means of tightening a nut to a certain position, a certain torque, or by means of a certain number of turns, etc depending upon the connector type, available equipment, manufacturer's recommendations etc. For some connector types, a nut may move along a threaded portion of the connector. Proper make-up of a fitting may be achieved, by tightening a fitting nut a predetermined number of turns beyond a finger tight position. For example, a fitting may be configured to be pulled up by tightening the fitting nut with respect to the fitting body 1¼ turns past finger tight. Movement of a connector portion in relation to another portion is considered to be movement of a changeable characteristic of a connector to a fixed characteristic.

The apparatus portion/s may be located at, into, along, across or between the space separating a fixed characteristic of the connector and a changeable characteristic of the connector.

A fixed characteristic of the connector may be any location, point, corner, surface, position, face or feature on the connector body. A changeable characteristic of the connector may be any location, point, corner, surface, position, face or feature on a nut. A fixed characteristic may be a fitting body. A changeable characteristic may be a fitting nut. The fixed characteristic and changeable characteristic may be the face of a fitting body, and a face of a fitting nut. A fitting body may also be considered a moveable characteristic and a nut a fixed characteristic depending on assembly practices.

The apparatus position may be changed, between a fixed, or number of fixed, characteristic/s and/or, a changeable characteristic, or number of changeable characteristics, on the fitting body (or other connection type or configuration) and secondary portions (nut, or other connection type, or configuration, or fluid connection piece).

The source of apparatus position change, or movement, may be between a fixed characteristic of the connector, and/or a changeable characteristic of the connector.

Position change, or movement, of the apparatus, may be by any means, to allow contact with a fixed characteristic and a moveable characteristic of the connector. Position change, or movement, of the apparatus, or apparatus component/s, may be by position change, or rotation. Position change, or movement, of the apparatus, or apparatus/component/s, may be by moving in an arc. Position change, or movement, of the apparatus, or apparatus component/s, may be along an axis parallel to the fitting body. Position change, or movement, of the apparatus, or apparatus component/s, may be along an axis at ninety degrees to the fitting body. Position change, or movement, of the apparatus, or apparatus component/s, may be by a moving a component, on, or along, another component, (for example only, a disc type shape, along a threaded rod). Position change, or movement, of the apparatus, or apparatus component/s, may be position change, in respect to, any another apparatus component/s. (For example a first piece position, may be changed, by rotation, or movement, in respect to a second piece, which may be a further component, a further component or second piece, may also be a display).

The position of the two or more device pieces may change individually or together, or in opposition to each other.

Movement may be, by manual, physical, or any means, as known in industry, for example, any driven method, gears, belts, electrically driven, thumb screw, etc, and/or any means of preventing overtightening and/or providing a constant force during measurement.

Movement may be, by one or more, apparatus component/s. Movement of the apparatus component/s may be, through a gap, between the fixed and moveable characteristic/s of the connector.

The apparatus may contact the moveable and/or fixed characteristic of the connector. The apparatus may stop upon contact. The apparatus may display, fitting condition upon contact. The apparatus may display, fitting condition severity upon contact. The apparatus may display, internal fitting features. The apparatus may display, position, location, movement, and/or dimensions. The apparatus may display, missing, reversed, and/or number of ferrules, or any other type of internal feature/s, or secondary fitting portion features. The apparatus may display, connector coupling information for any type of connector known in industry, made by any material known in industry. The apparatus may display, over tight, under tight, hand tight, or correctly tightened, fitting component features such as fitting nut/s.

Fitting condition/s may be pre-determined prior to apparatus use. Fitting condition/s may be pre-determined by reference to, or use of, a calibration or reference portion which may represent differing fitting conditions.

The apparatus information may be in the form of position. The apparatus information may be in the form of rotation. The apparatus information may be in the form of angle. The apparatus information may be in the form of distance. The apparatus information may be in the form of movement. The apparatus information may be obtained by measuring the thickness of the apparatus at the connector characteristic contact point/s. The apparatus information may be obtained by measuring the distance, dimension, or length, between a connector fixed characteristic and/or a connector moveable characteristic.

The apparatus information may be pre-set, pre-marked or pre-stored. The pre-set information may, for example, be connector condition, tolerances, such as overtight, under tight, hand tight, reversed ferrules, missing ferrules, additional ferrules, severity of condition, or any other information relevant to the connector type. Pre-set condition/s may be determined, from a calibration piece/s, or may be, by utilising pre-configured component/s, which may be changeable and/or replaceable. Pre-set condition/s may be uploaded, to the apparatus, or apparatus component/s, or uploaded to a further piece of electronic equipment, or uploaded to any database or software. The apparatus or user may record, and/or store, the apparatus information, in any form, which may be, converted, and or disseminated, at a later stage. Any or all apparatus information, which may include, for example, position, movement, rotation, dimension, condition, and/or severity rating, may be stored, or uploaded, to any form of database, or software, which may include a spreadsheet, which may include calculation/s for apparatus condition, and/or severity rating/s.

Apparatus, and/or fitting information, which may include fitting condition, and/or severity, may be marked or indicated, on the apparatus, displayed electronically on the apparatus, displayed by an attached display, which may be wired, or connected by any means known in industry, including Bluetooth etc, may be stored, and/or displayed, in the apparatus, in a further electronic apparatus, which may be, attached to the apparatus, or stored in a database, spreadsheet, or any other means of storage known in industry, including any storage drives, the storage method may also convert the information received from the apparatus, into further information.

The apparatus information may be displayed visually. The apparatus information display may be read manually. The apparatus information may be displayed electronically. The apparatus information may be converted to a connector condition and severity. The apparatus information may be displayed. The apparatus information may be recorded. The apparatus information may be stored. The apparatus information may be added to a database. The apparatus information may be recorded, and/or stored, and may be added to a database manually or electronically. The apparatus information may be recorded, and/or stored, and maybe later converted to a fitting condition and/or severity reading.

DESCRIPTION OF THE EXEMPLARY EMBODIMENTS

While the inventions are described herein with specific reference to a variety of structural and material features, such descriptions are intended to be exemplary in nature and should not be construed in a limiting sense. For example, the exemplary embodiments are described primarily in terms of a tube fitting utilising two ferrules. Those skilled in the art, however, will readily appreciate that any one or more of the aspects and features of the inventions may be used with different mechanically attached connections for pipes, including but not limited to, other pipe gripping arrangements (e.g., single ferrule designs) and other pipe fittings, with many materials, and with many different pipes including, but not limited to, tube or pipe. Moreover, many of the aspects of the inventions may be used for fittings intended for use in a variety of system pressures and temperatures, and with a variety of system fluids. Still further, many of the exemplary embodiments herein illustrate components that are externally threaded and receive and abut the pipe end commonly called male type fittings. Many aspects of embodiments will find application in female-style fittings as will be apparent to those skilled in the art. The invention will also find application for fitting assemblies and connector types that do not require threaded connections between the fitting components, and may be used to inspect, any type of connector, or fastener, used by industry, for example, the invention may be applied to, clipped, push-fit, clamped, clasped, latched, and/or bolted fittings etc. The invention will also find application far beyond the exemplary embodiments herein as to mechanically attached connections that may be made to a wide and ever expansive variety of fluid components including, but not limited to, other pipes, flow control apparatus, containers, manifolds, instrumentation fittings, hose connections, pneumatic fittings, valves, high purity fittings, gauges, sensors and so on. The invention will also find application in many other industry sectors where connectors are used such as aerospace, oil and gas, petrochemical, hydraulics, transport, climate control, filtration, fluid and gas handling, hydraulics, pneumatics, process control and medical for example.

Many types of fitting arrangements may be used to provide a fitting connection, including, for example, push-to-connect, tool-tightened (e.g., crimping or clamping), or threaded arrangements.

In one exemplary embodiment, the relative position, of the fitting nut 32 and the connector body 33 is evaluated to determine whether the position, is within a predetermined range of acceptable position/s with respect to each other. This may be done for a variety of different reasons. The relative position may be evaluated to confirm or ensure proper compression of the pipe connector on the pipe 34. In one exemplary embodiment, the position, between a surface of fitting nut 32 and a surface of connector body 33 will vary along the axial position, L1 (FIG. 9B) which is evaluated by the apparatus 30. This may be done for a variety of different reasons. For example, by evaluating the relative position, L1, missing components may be detected, too many components may be detected, incorrect component positioning may be detected, incorrect component orientation may be detected, overtightened connectors, under tightened connectors or correctly tightened connectors may be detected.

Figure 9A:
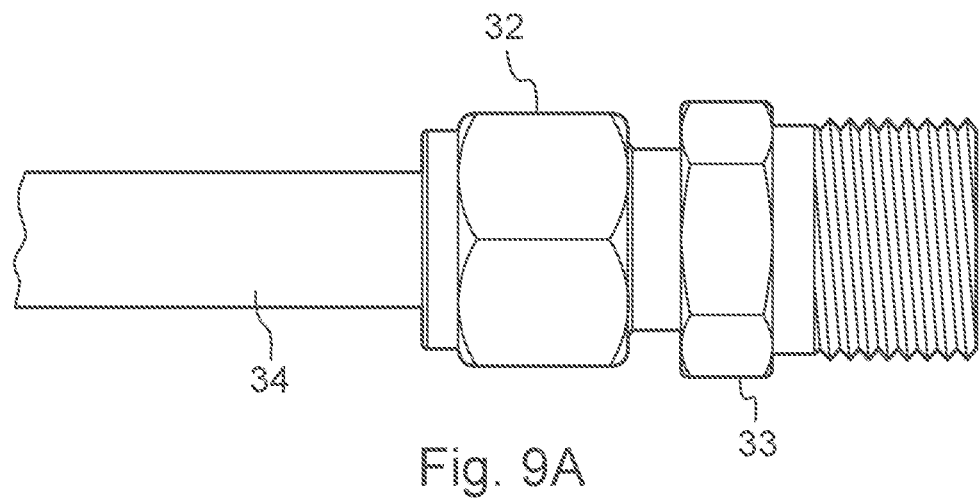
FIG. 9A illustrates a view of a type of pipe connector disposed around a pipe.
Figure 9B:
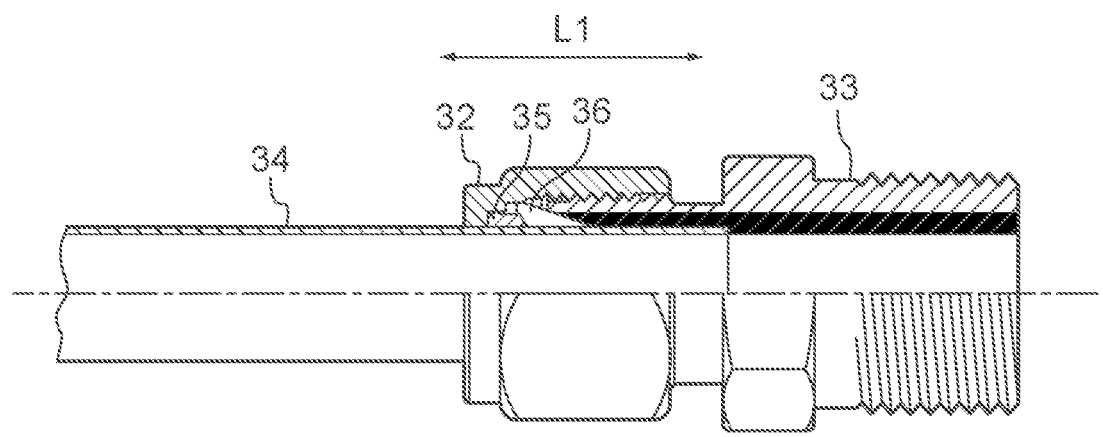
FIG. 9B illustrates a partial cross-sectional view of a type of pipe connector disposed around a pipe showing possible internal features.

In FIG. 9B, the rear ferrule 35 and the front ferrule 36 are correctly positioned. With the fitting nut 32 correctly tightened on the fitting body 33 the relative position, L1 between a changeable connector characteristic 32 and a fixed connector characteristic 33 may be determined. A change to the relative position, of L1 may be caused by any condition, including a reversed rear ferrule 35. This condition may be detected by evaluating the position, or movement, of apparatus component 20 and/or apparatus component 21 and the relative position, L1. Any type of display, or sensor, that indicates position changes between any portion/s of the apparatus 30 may be used. Examples of position, sensors include, but are not limited to, switches, proximity sensors, hall-effect sensors, inductive sensors, and the like. Any type of sensor or display capable of changing states when an apparatus component changes position, or moves, may be used.

The relative position, L1 would be expected to change with differing connector conditions specific to the connector type. The relative position or movement change of L1 may be compared with known or pre-set conditions. In this way for example under tightening of the nut 32, over tightening of the nut 32, missing or reversed ferrules 35, 36, incorrect number of ferrules or any other combination of missing components may be detected, additional components may be detected, incorrect component positioning may be detected and incorrect component orientation may also be detected.

Similarly, the condition where more than the prescribed number of ferrules are present may be detected by relative position, L1 changing.

The position, of L1 would be different than expected and/or by a different amount than expected and the incorrect component positioning is indicated Proper make-up of a fitting may be achieved by tightening a fitting nut a predetermined number of turns beyond a finger tight position. For example, a fitting may be configured to be pulled up by tightening the fitting nut with respect to the fitting body 1¼ turns past finger tight.

The apparatus 30 may be configured to detect a finger tight condition whereby the installer has not properly installed the fitting.

In some circumstances, the pipe connector, may be disassembled and reassembled. For reassembly the fitting nut 32 may be tightened slightly further. The apparatus 30 may also be configured to detect if the connector has been assembled one time, or has been assembled more than one time. The apparatus 30 may also be configured to detect if the fitting nut 32 is within manufacturers tolerances for tightening.

Figure 10:
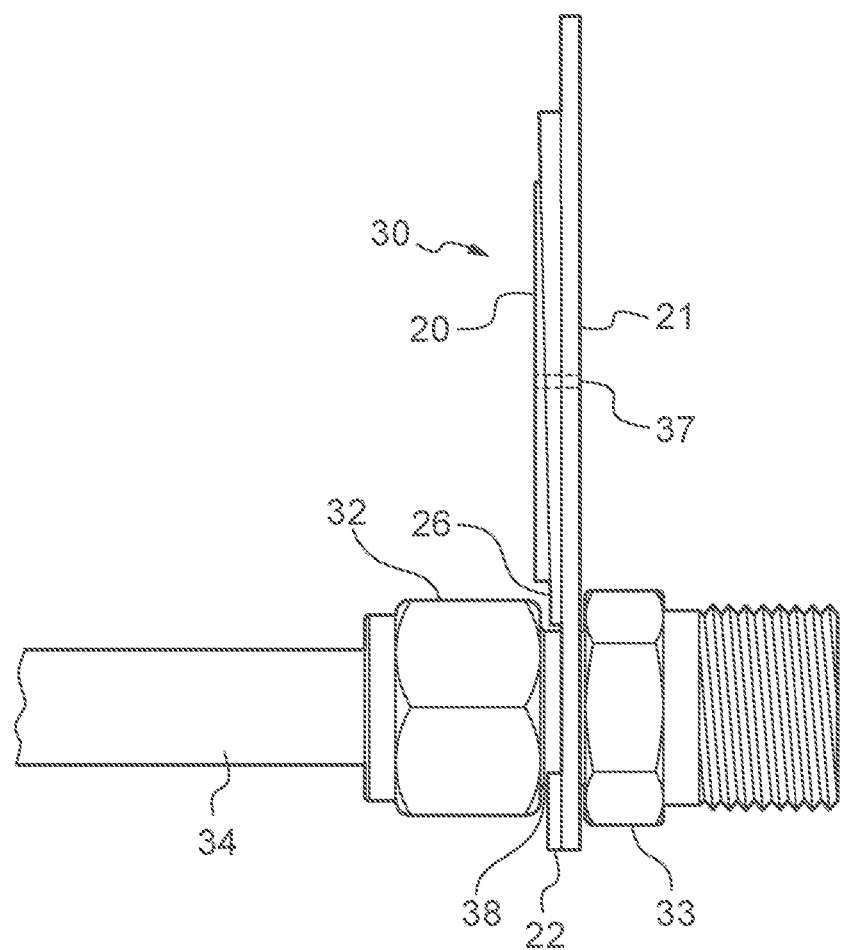
FIG. 10 illustrates a view of an exemplary embodiment of the pipe connector evaluation apparatus, assembled with a pipe connector, according to the present invention.
Figure 14:
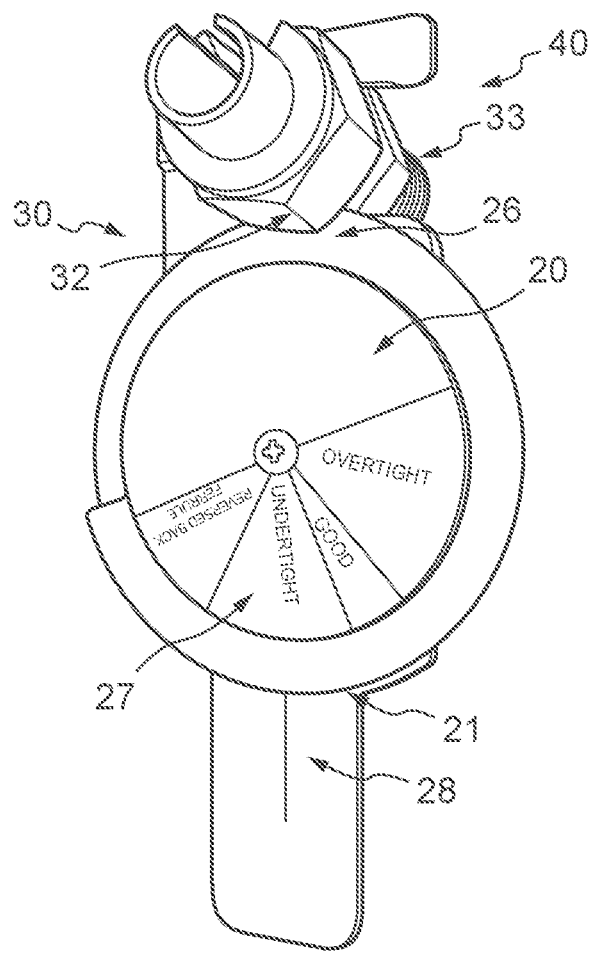
FIG. 14 illustrates a view of an exemplary embodiment of the pipe connector evaluation apparatus, assembled with a reference or calibration connector, an apparatus calibration check, for condition severity, prior to use, according to the present invention.
Figure 15:
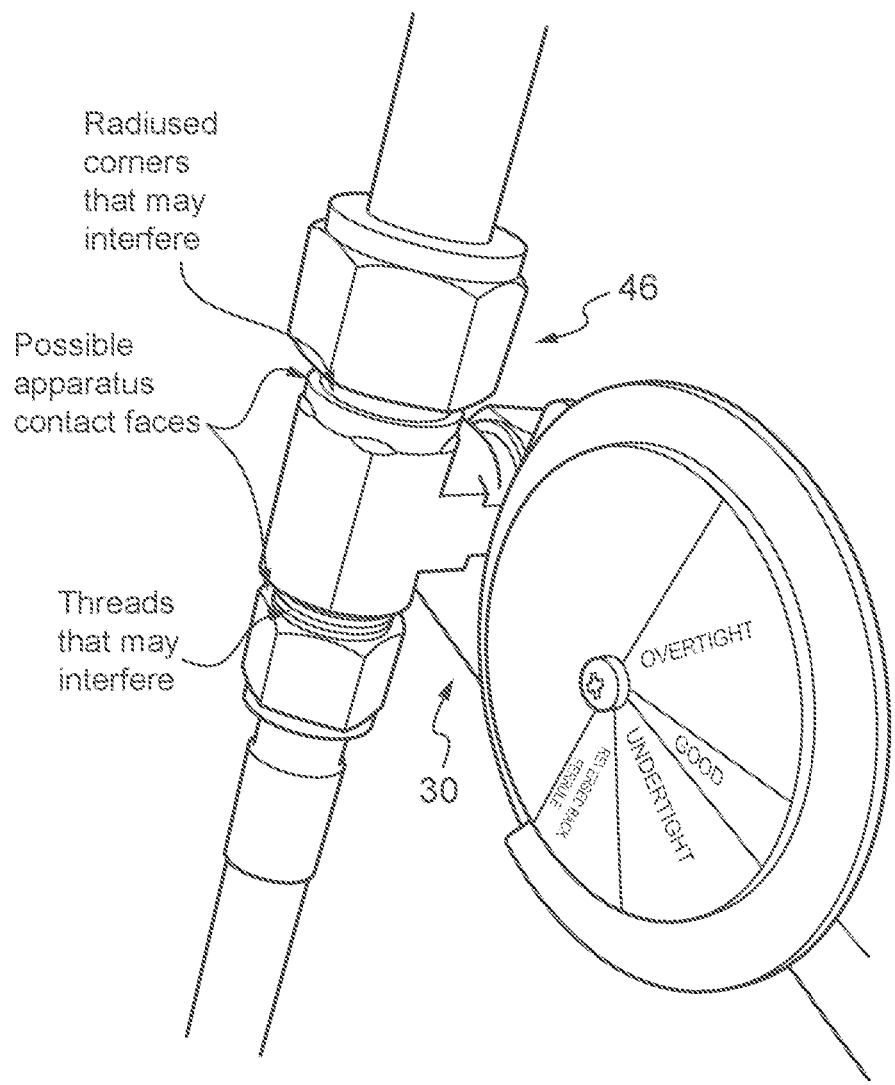
FIG. 15 illustrates a view of an exemplary embodiment of the pipe connector evaluation apparatus, assembled with a pipe connector of a different configuration, showing physical restrictions of differing pipe connector types, according to the present invention.

Referring to FIG. 10, an exemplary apparatus assembly 30 includes a shaped portion 21 located upon a fixed connector characteristic 33, shaped portion 21 however may be positioned around any fitting feature such as 33, a pipe 34, or a changeable connector characteristic 32, for example (FIG. 10A-F) (FIG. 15). The illustrated shaped portion 21 may include a grip feature 29 (FIG. 7) (FIG. 19) which may be detachable and/or replaceable, may include a shaped feature 23 (FIG. 1) (FIG. 7) to locate the connector or pipe features, to allow accurate location and position, of the pipe or connector in the apparatus. The shaped feature 23 may also comprise a shape/s to allow contact only with the intended area, and not to allow contact with any pipe, connector, or connector secondary feature that could interfere with the apparatus readings (FIG. 4A), such as, threads, radiused corners, or any other feature for example 38 (FIG. 10) (FIG. 15). The apparatus portion 21 may also have a shape 39 (FIG. 1), to allow fast location of the apparatus 30, and aid in guiding the apparatus accurately into position. The shaped portion 21 may have a means of attaching another portion or portions 37. However, the shaped portion 21, may be replaceable, take any form, shape, or configuration, and may include any number of features to allow movement, location, and fitment, to a variety of connector types, sizes, and other apparatus portions, and pipes, if the apparatus design requires. Shaped portion 21, may also have an indicator or marking/s 28, to allow apparatus 30, information to be read, when aligned with further indicator/s or markings 27, of portion 20 (FIG. 7) (FIG. 14). Marking/s or indicators may be interchangeable between any portion/s of apparatus 30. Marking/s or indication/s may be a separate component/s which may be attached to another component in the apparatus, for example if a differing connector was to be examined then a component with the new tolerances and/or markings could be simply replaced and attached to component 20.

The portions 20, 21 of the apparatus may be connectable or coupled by any means known in industry such that when the first and second portions are connected by 37 they form the apparatus 30 and typically a portion/s of the apparatus may change position or move.

When the apparatus portion/s move they may allow indicator marking/s to align. The apparatus may comprise two portions or more. A display 31 (FIG. 18) may be considered a second portion. The portions 20, 21 of the apparatus may be connected by a pin, bolt, screw or any other means of engagement known in industry 37. The first and second portions of the apparatus may change or move position by any means, for example, may be rotatable relative to one another, thereby allowing the apparatus to move to the desired position/s.

The apparatus may have a means to stop, 41 (FIG. 13) the position, of the first and second portions relative to each other. The stop may be a 'zero' point for an electronic display or a known start point for position.

In an alternative embodiment the first portion 20 may be separable and replaceable. When the portions 20, 21 are separable, the portion 20 of the apparatus may come into contact with a feature, point, surface, or portion of the connector body and/or nut to allow contact with the desired point/s. The first portion 20 may be replaced with another portion of a different configuration, different size and/or thickness, or a differing shape, or a portion with differing markings or indications, in this manner the first portion may be changed to fit a differing shape connector or connector secondary piece (such as a nut) points to be contacted, any portion of the apparatus, including the first portion 20, sensitivity, and tolerance range, may also be varied, for example, by changing configuration, dimension, diameter, circumference, shape, number and shape of sections, distortion, or pressed shape, slope of any gradient 26 (FIG. 2A), or thread pitch 26 (FIG. 2), thickness, helix, number of step/s, or angle of steps, 26 (FIG. 12)(FIG. 18) for example, thread pitch, if connected by means of a screwed rod, or bolt, 43 which may be any connector type, or attachment, known in industry (FIG. 10C-F), thread pitch if a square thread or any other thread design is used 26 (FIG. 2), differing component configuration 44 (FIG. 16), or any other configuration component. Apparatus markings and display may be changed, to suit particular fitting conditions, of interest, or tolerance zones, or particular condition, thereby allowing many differing fitting dimensions and shapes to be examined for any particular condition with any variable tolerance.

Any portion may of apparatus 30 may be replaceable.

In an alternative embodiment the first portion 20, may be any shape, that may change position, by any means, and/or that may be separable, or replaceable.

In another alternative embodiment the second portion 21, may be a shape that may change position, and may be replaced. The second portion 21, may also be used to vary sensitivity of the apparatus, for example only, if the apparatus was placed in a gap, and portion 21, was increased in thickness then portion 20 may be reduced in thickness, allowing 20 to be a reduced thickness, may increase sensitivity, by reducing the gradient or slope of any edge of 20 to be less, therefore when 20 is rotated, for example, less gradient would result in less movement during rotation, which would result in a greater sensitivity.

Figure 10A:
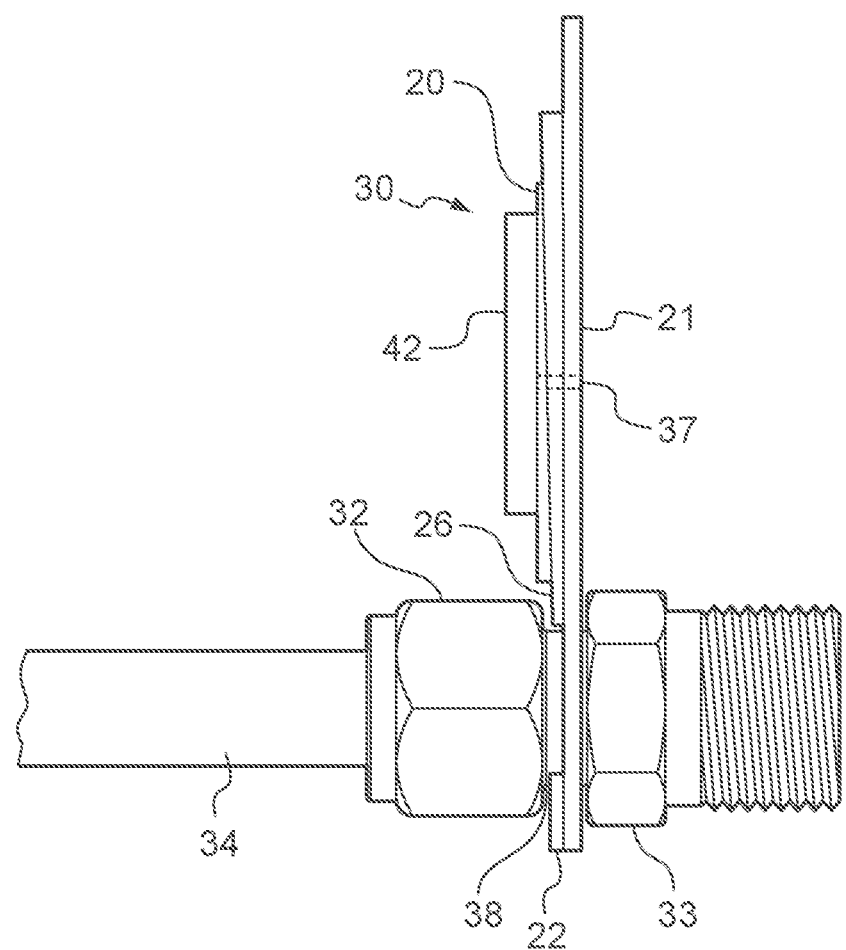
FIG. 10A illustrates a view of an alternative apparatus of an exemplary embodiment of the pipe connector evaluation apparatus, assembled with a pipe connector, according to the present invention.

The apparatus may be a three portion or more design (FIG. 10A) (FIG. 17) (FIG. 19), referring to FIG. 10A, the first portion 20, may be a circular type shape, that may be attached to the second portion 21, and may have a further portion attached 42, to the first portion 20, in this way the first portion 20, may be in between two other portions, and may move, or rotate. The portion 21 and the further portion 42 may be fixed allowing the portion 20 to rotate. Further portion 42 may have a display and/or markings of any type. Other apparatus pieces may be connected in many configurations, for many purposes, for example, 45 (FIG. 17) is added to provide support to 42 and 21.

The apparatus may be any configuration or number of components to suit the connector type, connector configuration, type of display, method of movement, method of communication with another apparatus, or any other consideration. The first portion 20 and portion 21 may be any shape, to fit many differing connector types, configurations, to fit the relevant points, or faces to be contacted, to suit the connector, pipe, apparatus shape, display, communication interface, any other portion, requirements for gripping or holding by the user, avoid threads, or radiused corners, or any other features required.

Figure 7:
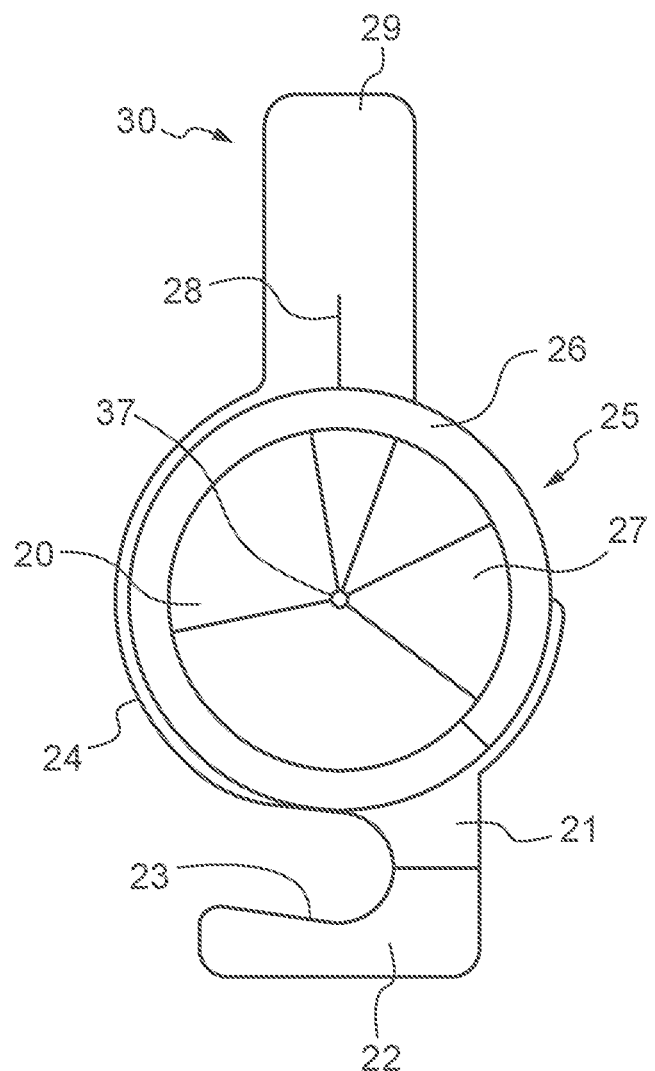
FIG. 7 illustrates an assembled apparatus with features of an exemplary embodiment of the apparatus according to the present invention.
Figure 18:
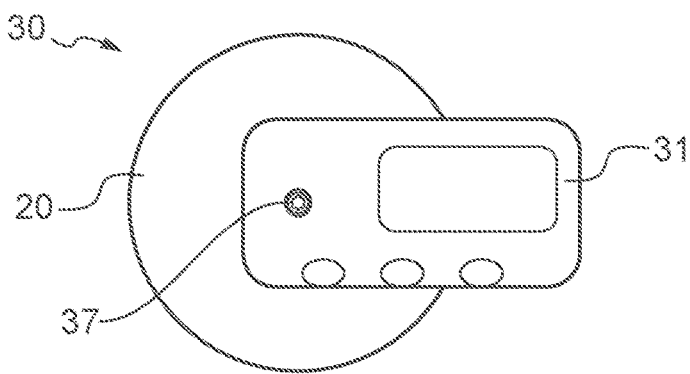
FIG. 18 illustrates an alternative view of an exemplary embodiment of the pipe connector evaluation apparatus in a two piece assembly, with some example alternate configuration types of the apparatus pieces, according to the present invention.
Figure 18:
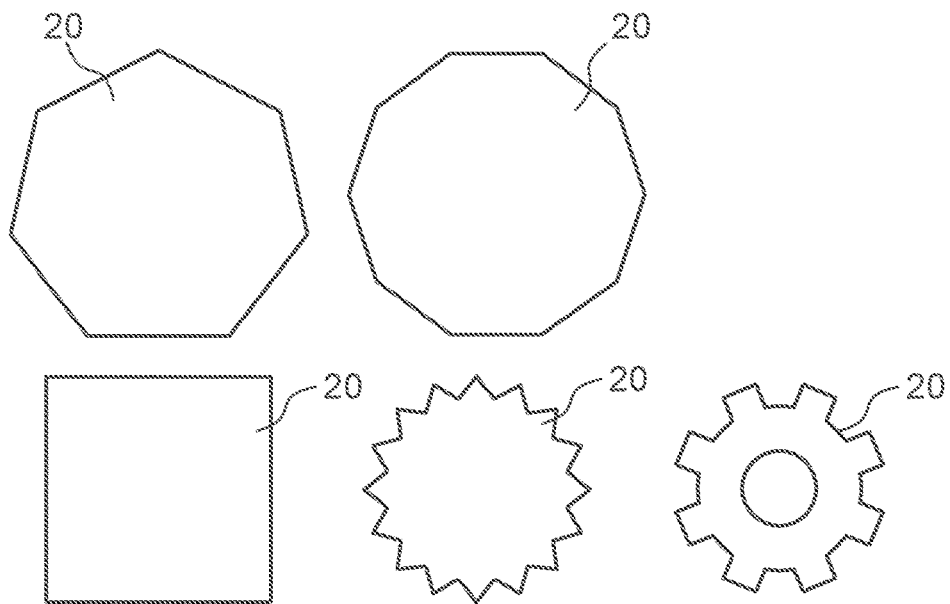
Figure 18:
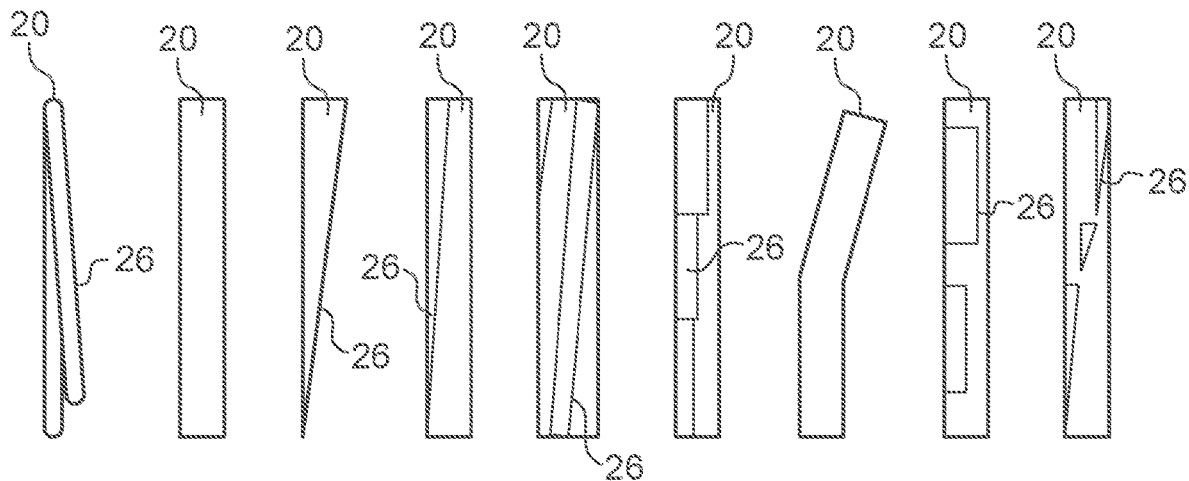

In another alternative embodiment the portion 21 may be shaped to accommodate a fitting coupling member, or pipe, or fitting secondary piece, or any other type connector design, pipe design, or secondary piece design. The component 21 may have pieces that may be separable, replaceable, adjustable, have detachable, and/or replaceable end/s, or may allow additional portions to be added, for example to change the slot width and/or angle, which may allow fitment of differing connectors. When the first and second portions are separable, the portion 21 of the apparatus may be positioned to allow contact with a desired point/s. The second portion may be designed to fit the connector, or pipe, or connector secondary piece, and any shape that may fit the desired contact point/s. The portion 21 may also be shaped, to avoid any features of the connector which may interfere with the device such as threads, radiused corners, edges or any other features 38 (FIG. 10) (FIG. 15). The second portion may vary thickness or shape in differing areas 22 (FIG. 3) (FIG. 10) to allow better contact and less movement of the apparatus during assessment of the connector (22 may also be formed, or shaped, by any means known in industry, bent, dimpled, pressed, glued, coated or may consist of an additional piece/s for example). The second portion area 22 may also, be adjustable, or replaceable, this may allow device fitment to differing connectors or pipes. The second portion shape may be designed to grip the contact area, and/or hold the connector 23 (FIG. 7) during position change or movement of the first portion 20. Position change or movement of the first portion 20 may cause a force which aids movement of the apparatus to the correct position upon the connector ensuring the apparatus is held in the correct position, during connector assessment. The portion 21 may be, adjustable, or replaced with differing size, thickness, portion/s, differing shapes or configurations for example (FIG. 1, FIG. 3, FIG. 4, FIG. 4A, FIG. 5) to allow differing shape, and/or diameter, pipe or, connector types to be examined, the second portion may have an indicator mark/s to indicate connector condition 28 relative to the first portion indicator/marks 27 (FIG. 7). In this manner the portion 21 may be changed to fit a differing shape, or diameter, pipe or, connector or connector points to be contacted. The second portion may be any shape, to suit the connector, pipe, apparatus shape, display, communication interface, the first portion, position, movement, requirements for gripping or holding by the user, restrictions to use, or any other features required. The second portion may also be a display 31 (FIG. 18).

In another alternative embodiment, the second portion 21, may be any shape, connected to 20, which may be any shape, and allow any position change, relative to each other, by any means of movement, both of which may have mark/s, indicator/s, by any means known in industry, which may align, for differing connector conditions, both pieces may be positioned at, across, or within, a fixed, and/or changeable connector characteristic/s.

The display, which may be any type known in industry, may be attached, or incorporated, into any of the apparatus portions, or may be separate.

The markings or any type of feature or symbol used to give information may be made by any industry known method. Marking/s on portion 20 may be substituted for marking/s on portion 21 and vice versa. Markings may be on any apparatus portion, in any position.

In another alternative embodiment, the two or more portion apparatus 30, may be positioned over, or on, a connector, or pipe, or portion of the connector, and position may be changed, or moved to allow contact with the desired point/s, on the connector, changeable characteristic, and/or fixed characteristic. The apparatus 30 may be shaped to allow contact with the relevant points. A direct reading of condition may be displayed.

In another alternative embodiment the apparatus 30 may consist of a portion 20 and a display 31 connected by connector 37 (FIG. 18). Any reading may be displayed by any means including marking, indications, or by electronic means. The display, and/or marking/s, or indicator/s may be replaceable, and may be a separate portion.

In another alternative embodiment the apparatus 30 may have no display. The apparatus may record, and/or store, fitting information, fitting condition, fitting condition severity, and/or any apparatus information to be uploaded or downloaded at a later time.

In another alternative embodiment the apparatus may be positioned over a portion of the connector and/or the pipe (FIG. 10C, FIG. 10D, FIG. 10E, FIG. 10F). The apparatus 30, may have a rod, and/or threaded bar, or any other type of connecting, or attachment, piece, 43, and may allow movement, along the axis, of 43, such as, for example, a circular or curved portion 20 to be rotated or slid until contact with the relevant connector point/s. Position change of 20 or 21, until contact, may be by any means, including for example, by sliding, or rotation, until contact with a desired point/s. The apparatus may be shaped to allow contact with the relevant points only. A direct reading of condition may be displayed.

Figure 8:
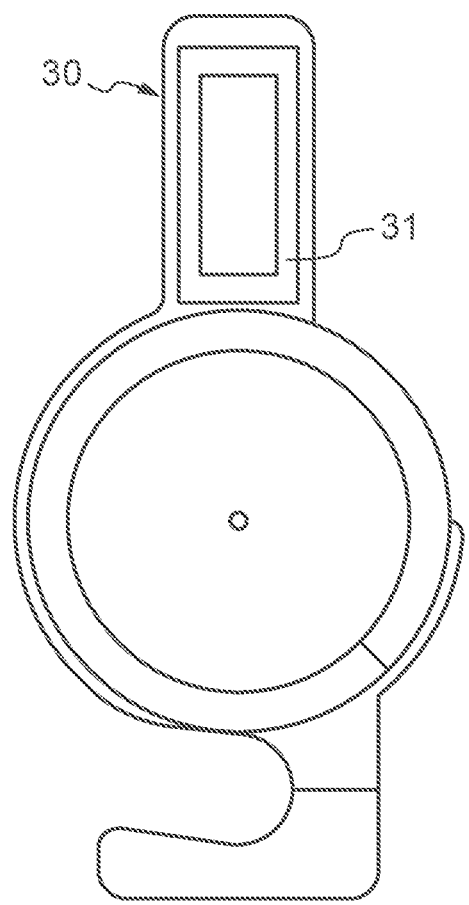
FIG. 8 illustrates an alternative apparatus display of an exemplary embodiment of the apparatus according to the present invention.

In another alternative embodiment the apparatus 30 may compromise a first portion, and a second portion. The first or second portions may have a marked visual display. The first or second portions may have a permanently attached or detachable electronic display 31 (FIG. 8). The display may be wired or connected by another means such as Bluetooth, Wi-Fi or other connection means known in industry. Any portion of the apparatus 30 may have a means of communicating, with each other, or any another portion of the equipment, display, memory, storage medium, communication apparatus or any other type of electronic apparatus, communication may include, but not be limited to positional information, dimensional information, fitting condition, fitting details or any other relevant information.

The apparatus 30 may download, or upload, connector details, or any other information including but not limited to, condition, severity, connection details, location details, inspection details etc. The apparatus 30 may download or upload information to or from a database, cloud storage system, or other apparatus which may perform these functions.

The apparatus 30 may upload information regarding fitting types, tolerance information, or any other information, to allow connector condition to be displayed for differing connector types. The display may be connected to further equipment to download connector condition.

In another alternative embodiment, portion 20 of the apparatus 30 may have a condition indicator 27 for communication with a condition indicator 28 in the portion 21 (FIG. 7) (FIG. 14). Upon utilising the apparatus the indicators may align, or indicate, such that the condition of the connector may be displayed (FIG. 14) (FIG. 15).

Figure 19:
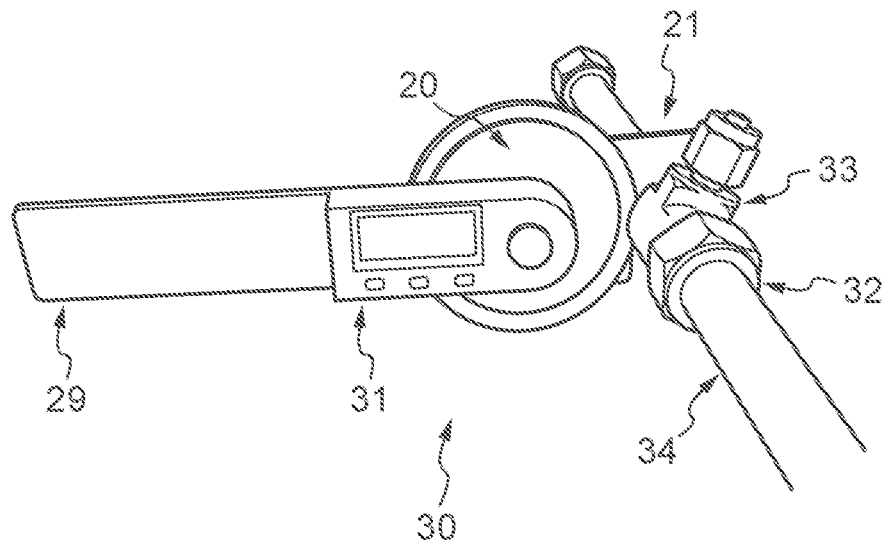
FIG. 19 illustrates an exemplary embodiment of the pipe connector evaluation apparatus with a detachable grip, position, detector, measuring position, or rotation angle, attached to the apparatus pieces.
Figure 19:
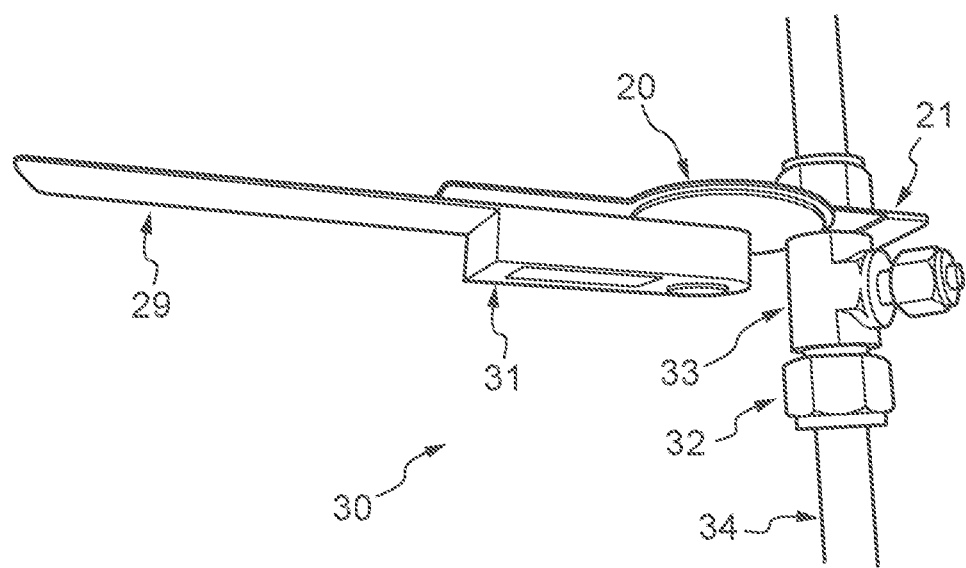

The condition of the connector may also be displayed by monitoring the position, of the apparatus, for example, the amount of angle, distance, thickness, or movement information, of the apparatus. The apparatus may use any type of position, sensor known in industry, for example only, position, or rotation of the apparatus may be measured by any mechanical or electrical means known to industry such as, for example, an accelerometer, rotary encoder, optical encoder, hall effect sensor, stepper motor, grey coded disc, potentiometer, incremental encoder or resolver, incremental or absolute outputs, magnetic systems, for example. Position, rotation angle, distance, movement, thickness or any other feature of a device portion, may be utilised to determine fitting condition/s. Information may be displayed electronically, visually, audibly or by any other means, information may be displayed as a zone and marked on any portion of the apparatus 30. Any apparatus information obtained, may be displayed electronically 31 (FIG. 18) (FIG. 19). Any apparatus information obtained, may be converted, by any means, into another form of information, for example condition and/or severity information. Known connector conditions may be used to pre-set the apparatus. Pre-setting may be by, uploading information, or by use of a reference or calibration piece/s 40 (FIG. 14). Reference or calibration pieces may have known connector conditions present.

In this manner the apparatus may be used to determine fitting condition,

In one alternative embodiment, the apparatus may be pre-set for a known fitting type and configuration.

In another alternative embodiment, the apparatus may be pre-set for a known fitting condition and/or severity.

If the connector type is changed, for example the diameter of the fitting and pipe is different, the apparatus 30 may have a changeable piece 20 and 21 to allow the new connector type to be examined. The tolerance and condition information for the new connector type may be uploaded to the apparatus 30, or a reference, or calibration piece, or any other type of piece to set connector information, may be used to set the tolerance and condition range 40 (FIG. 13), or a differing shape component 20, may be a pre-set shape, for the new connector type, with tolerance and condition information set by the shape of component 20 (FIG. 18).

Calibration and reference piece/s may be used, to confirm the apparatus settings prior to use, and/or at regular intervals, calibration, or reference piece/s may be made from any material, and made by any method, known in industry, Calibration, or reference pieces, may be, actual fitting components, which represent the features to be measured, and/or specific fitting conditions.

The apparatus, may be checked, using the calibration or reference piece/s, for accuracy, drift over time, wear over time, damage, or any other condition, which may cause improper readings or display.

Condition markings on apparatus 30, may be at a point, not aligned, with the portion 20 or 26 contact point with the connector, to aid reading of the connector condition (FIG. 14) 27, 28 and reduce human factor errors.

The apparatus may further comprise a feature 24, to stop or at least mitigate damage, to the contact area 26 of the first portion 20 (FIG. 7), damage to portion 20 or 26 may render the apparatus readings inaccurate or the apparatus unusable.

In one embodiment portion 21 (FIG. 5) may be designed such that accidental damage which may occur during use such as damage from dropping the apparatus etc may be mitigated by the design of a lip, protrusion, grip or extension of the shape of the portion 21 such that the second portion configuration may extend in some areas past the contact point of the portion 20, in this way dropping or accidental damage may occur to the portion 21 with no or mitigated damage to the portion 20 and the apparatus may still be used successfully.

Figure 5:
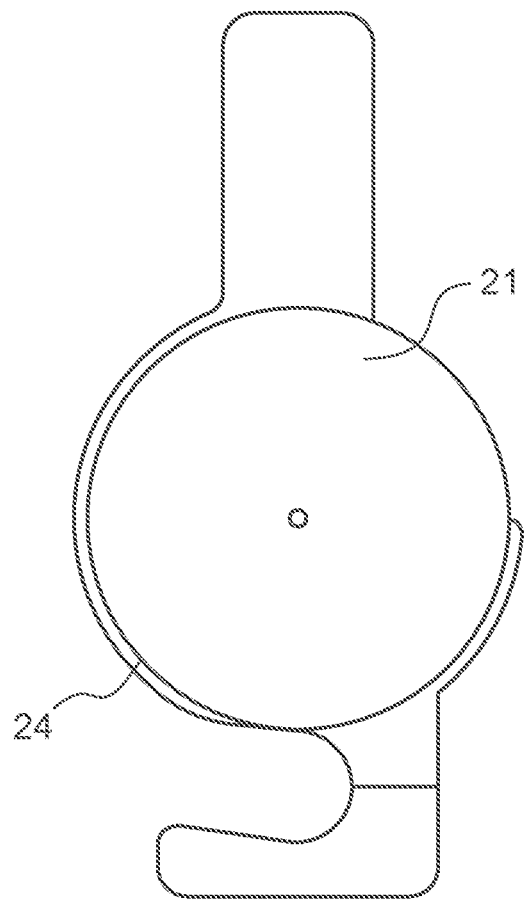
FIG. 5 illustrates a further component type of an exemplary embodiment of the apparatus according to the present invention.

Referring to FIG. 5, a feature of portion 21, may consist, of a circular or curved edge 24, which may extend past the edge of the portion 20 when attached.

In another embodiment, portion 21 may have a gripping piece, or other configuration (FIG. 4) 29, designed for the user to grip, and/or to protect the portion 20, if dropped or damaged.

In another embodiment the apparatus may be made from any material known in industry, by any method known in industry, and may, be made from a material, which is less likely to suffer impact damage, and/or, may be made from a material, considered intrinsically safe.

In another embodiment the apparatus may be made from any material known in industry, which may not cause a spark, or other ignition source, when dropped, or impacted, or comes into contact with, another material, flammable gas, liquid or solid.

In another embodiment the apparatus may be made from a material known in industry which may withstand the environmental conditions to be encountered during use, such as outdoor conditions, wet conditions, contact with chemicals, liquids, contamination, hot/cold temperatures, abrasion etc. and remain unaffected.

The apparatus may be manufactured from any suitable material known in industry. The apparatus may be manufactured from any manufacturing method known in industry.

The pipe and connector may be referred to as a tube, or tubing, and/or small-bore tubing. The pipe may be suitable for the transportation of fluid or solid material. Whether the material is a gas, a liquid or a solid will typically depend on temperature and/or pressure of the material. The material may form a portion of a multiphase transport system. The fluid may be a hydrocarbon, for example natural gas or crude oil. The pipe and/or connector may be made of metal, or any another material known in industry, including plastic materials. Plastic materials may include polyvinyl chloride (PVC), chlorinated polyvinyl chloride (CPVC), fibre reinforced plastic (FRP), reinforced polymer mortar (RPMP), polypropylene (PP), polyethylene (PE), cross-linked high-density polyethylene (PEX), polybutylene (PB), and acrylonitrile butadiene styrene (ABS), for example.

In use, the pipe typically passes through the axis of the connector.

In use, the apparatus may be used to determine fitting condition and severity. The apparatus may determine fitting condition and severity from any variety of apparatus information gained. The information, for example, typically may be the position change, or rotation angle of the apparatus or apparatus portion/s. The information may be the dimensions of the apparatus portion/s. The information may be the amount of apparatus portion/s movement. The information may be the apparatus portion/s movement along an axis, or along a circumference or arc. The condition of the connector may be determined by comparing information from the apparatus with pre-known and/or pre-set conditions, or determined at a later time by another means.

It will be appreciated by those skilled in the art that the invention may be used with any conveniently available form of information.

The apparatus, comparison method, and display may be chosen to suit the particular application. The apparatus is normally a relatively small, portable, handheld apparatus, which may provide information, regarding the condition of a connector.

The apparatus may be portable, that is the apparatus is typically hand held and/or moveable between many different pipes, pipe fittings and connection types.

The apparatus may be particularly adapted to the inspection of critical connectors made of any material. High and medium pressure pipe and pipe fittings are typically made of metal.

The apparatus may be periodically calibrated with a portion or piece/s with known conditions or representative known conditions. The portion may be known as a calibration or reference portion or piece/s.

The apparatus may be referred to as an inspection apparatus. The apparatus may be used to inspect the integrity of a joint between two sections of pipe, or between a section of pipe and a fitting at one end of the pipe, or between any other type mechanical connector known in industry. The apparatus may be used to determine if there is a proper connection between the pipe and the pipe fitting. The apparatus may be used to assess the integrity of a pipe fitting without disassembling the pipe fitting from the pipe. The apparatus may be used to determine the condition of the connection when the end of the pipe is inside the pipe connection.

The apparatus may be also be used to assess the integrity of other types of mechanical connector/s, in other types of materials, that may be connected, in particular bolted connections, hose connections, medical tube connections etc that may be incorrectly connected, or may vary with incorrect connection, or may vary with use, damage, deterioration, or any other condition during use.

The apparatus may also be used to determine that any type of connection and connector/s that are in use or in-service are in a satisfactory condition, and correctly connected.

The pipe fitting may be secured to an end of a section of pipe using a nut and ferrule/s. The nut is normally used to compress the ferrule/s onto the pipe and thereby secure the ferrule/s to the pipe. The pipe and ferrule/s are located in the fitting and the nut used to hold the ferrule and therefore also the pipe in the fitting. The number, position, and orientation of the ferrule/s on the pipe is a factor in determining the proper connection, sealing and pressure ratings between the pipe and the pipe fitting.

Incorrect fitment of the ferrule/s, missing or reversed ferrule/s at the end of the pipe, a reversed back ferrule in a two ferrule system, and/or the incorrect thread engagement of the nut with the pipe fitting, mixed manufacturers fitting components assembled together, metric and imperial components assembled together, overtight, under tight, finger tight, connections and/or severity of the conditions, may also be assessed, using the apparatus, according to the first aspect of the present invention.

The apparatus may be calibrated using a pipe having a known condition, and/or pipe and pipe fittings that have been correctly or incorrectly connected together, and/or a portion or piece that represents the conditions. The apparatus may be connected to a display, output apparatus, or other electronic apparatus, or may be read by another apparatus, to generate an output, for example an image, audible or visual output. The apparatus information may be stored by any means for use at a later time.

The apparatus may be used to determine connection condition between a fixed characteristic of any connector and a changeable characteristic of any connector or connector secondary portions. The apparatus portion/s may be the same during inspection of similar types and sizes of connectors and may be changed, replaced, or a different apparatus design, used for different types, diameters, and/or sizes, or configurations, of connectors. The apparatus design to contact, locate, grip, change position, or rotate etc will typically vary when the portions of pipe and pipe fittings have different dimensions, external diameters and shapes.

The apparatus of the present invention may be a non-destructive test to determine the mechanical connection condition of a pipe within a pipe fitting even when there is fluid, solid or gas in the pipe. There may therefore be no need to purge the pipe or system comprising the pipe or disassemble any components of the system to undertake the test.

DETAILED DESCRIPTION OF THE DRAWINGS

FIG. 1 illustrates an exemplary apparatus component design 21, which has a gripping portion 29, a shape 23, to allow location of the component 21, to fit the surface features of the component that 21 is to be positioned upon, a further shape 39 to guide the component 21 to the surface to be positioned upon, and a means of attaching 21 to another apparatus portion/s 37.

Figure 2:
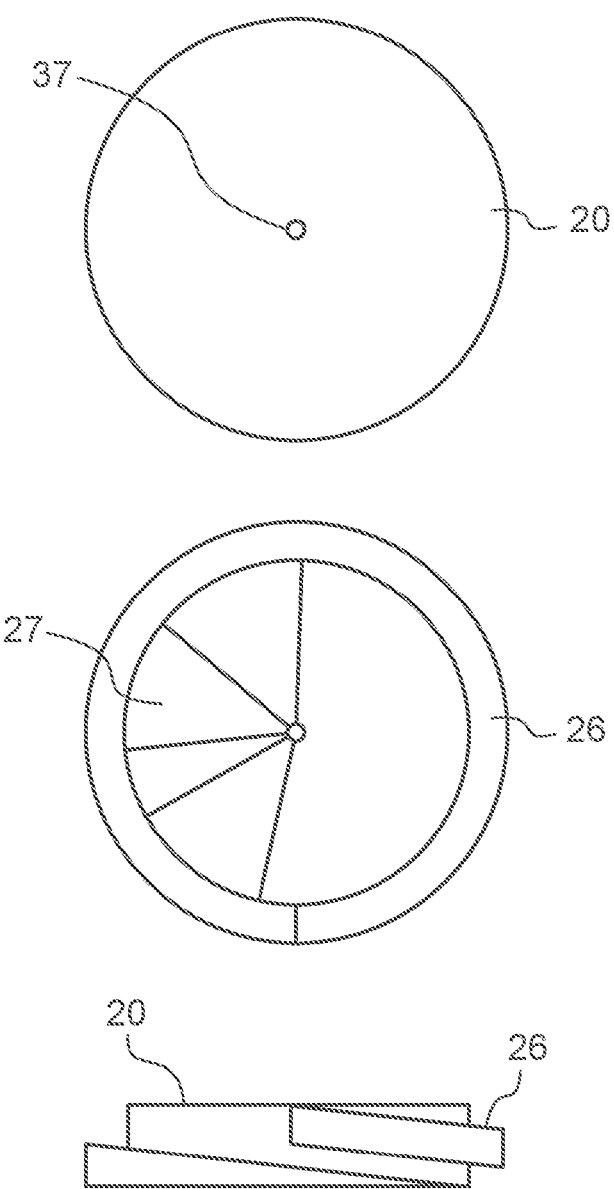
FIG. 2 illustrates a second component of an exemplary embodiment of the apparatus according to the present invention.

In FIG. 2, an exemplary apparatus assembly 30 may further include a shaped portion 20 movement of which causes the portion to contact a fixed characteristic feature of the connector 33 or a changeable characteristic feature of the connector 32 (FIG. 9A). The illustrated shaped portion 20 may include a feature 26, which allows 20 to move, along axis L1 (FIG. 9B), by change of position of 20, for example, rotation of 20. In FIG. 2 the preferred method of movement is position change, by rotation of portion 20 by a square thread feature, However many methods or configurations may be used to move 20 to contact, including, but not limited to, for example, a trapezoidal form, any other thread feature, a shaped piece such as 44 (FIG. 16), or any other example (FIG. 18) (FIG. 10C-F), it will be appreciated that portion 20, many be any shape, or configuration depending upon, connector configuration, apparatus configuration, sensitivity required, access to the connector, indicator or display method, and many other considerations. Portion 20 may also have marking/s or indicator/s 27, to indicate connector condition and severity (FIG. 2) (FIG. 7) (FIG. 14), and means of attaching another portion or portions 37. However, the shaped portion 20 may take any form and may include any number of features for example, to allow movement, location, sensitivity, number of connector conditions to be examined, and fitment to a variety of connector types and sizes and other apparatus portions.

Figure 2A:
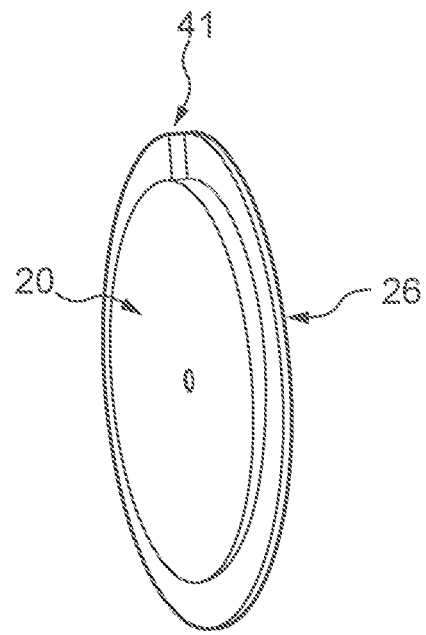
FIG. 2A illustrates a further component type showing different features of an exemplary embodiment of the apparatus according to the present invention.
Figure 2A:
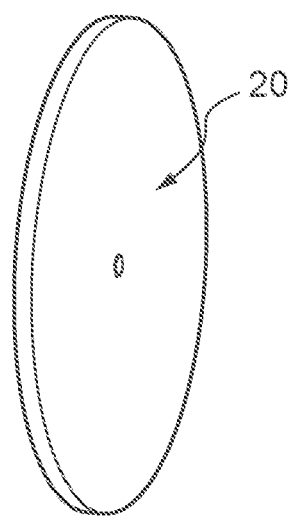

FIG. 2A illustrates a three dimensional view of an exemplary apparatus shaped portion 20, change of position or movement of which causes the portion to contact the connector 33 or connector second portion 32 (FIG. 9A) with a differing design of feature 26, and a stop feature 41.

Figure 3:
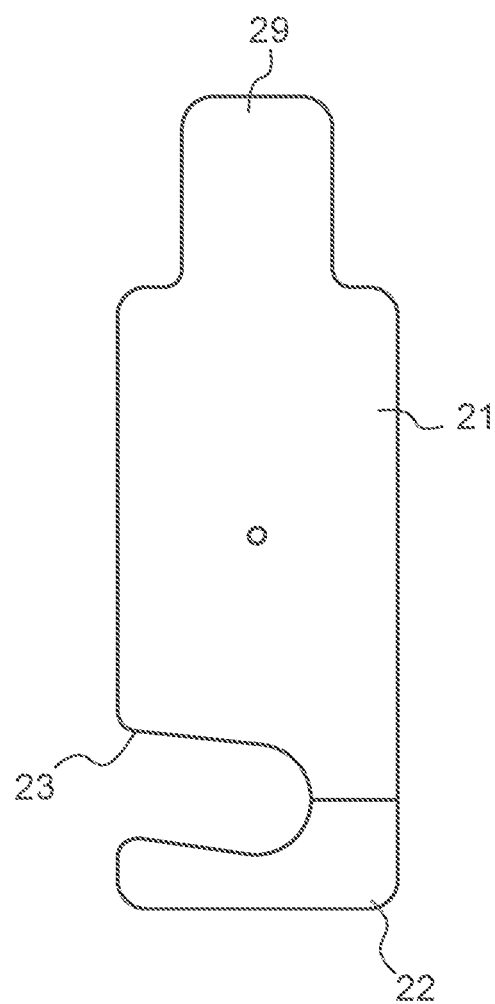
FIG. 3 illustrates a further component type showing different features of an exemplary embodiment of the apparatus according to the present invention.

FIG. 3 illustrates a further exemplary apparatus assembly shaped portion 21, the illustrated shaped portion 21, includes a gripping feature 29, a differing configuration feature 23, to locate the pipe or connector, and hold, or lock, the apparatus 30 more firmly in position, a change of shape or thickness 22, to reduce movement of the apparatus 30, whilst in use, illustrating how the shaped portion 21 may take any form and may include any number of features to allow position change, movement, location and fitment to a variety of connector types and sizes and other apparatus portions.

Figure 4:
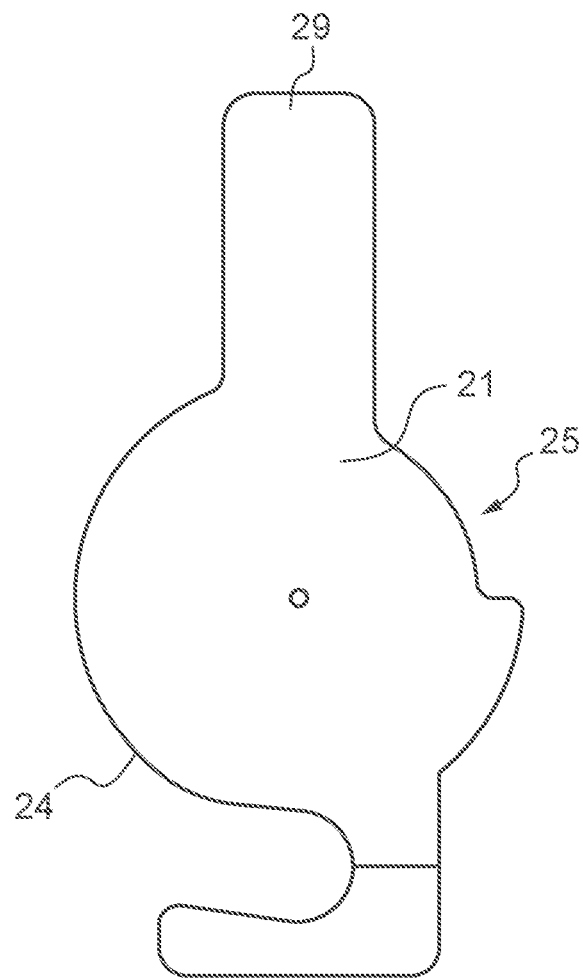
FIG. 4 illustrates a further component type showing different features of an exemplary embodiment of the apparatus according to the present invention.

FIG. 4 illustrates a further exemplary apparatus assembly shaped portion 21, The illustrated shaped portion 21, includes a gripping feature 29, a shaped protrusion that may be provided in many different configurations, including, for example, a ridge, shoulder, or projection, 24, to allow some protection to portion 20 when attached, a shape, which may form a gap, 25, to allow manual operation of the apparatus, further illustrating how the shaped portion 21 may take any form and may include any number of features to allow position change, movement, location, and fitment to a variety of connector types and sizes and other apparatus portions.

Figure 4A:
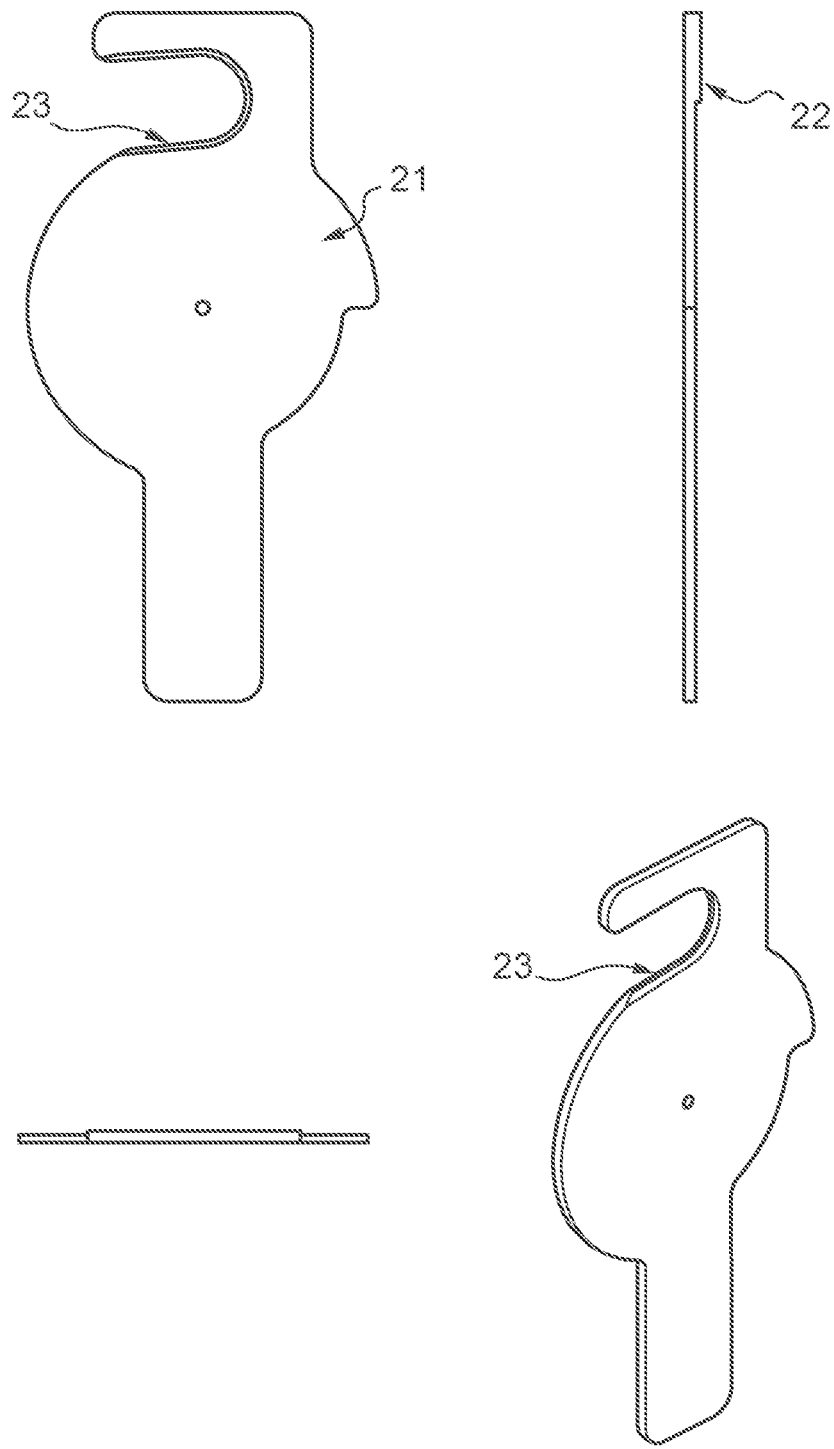
FIG. 4A illustrates the component type of FIG. 4 with additional views of an exemplary embodiment of the apparatus according to the present invention.

FIG. 4A illustrates further views of shaped portion 21, showing a further configuration of 23 (chamfered, curved or rounded edges for example) which allows the portion 21 to be located without any interference from connector or connector secondary features, such as, for example, threads, radiused corners, edges or any other feature, dependent upon connector type and configuration.

FIG. 5 illustrates a further exemplary apparatus assembly shaped portion 21, the illustrated shaped portion 21, may include a raised portion protection feature 24, to allow shaped portion 20, to fit within the shaped portion 21, the raised portion feature further illustrating how the shaped portion 21 may take any form and may include any number of features to allow position, movement, location, protection and fitment to a variety of connector types and sizes and other apparatus portions.

Figure 6:
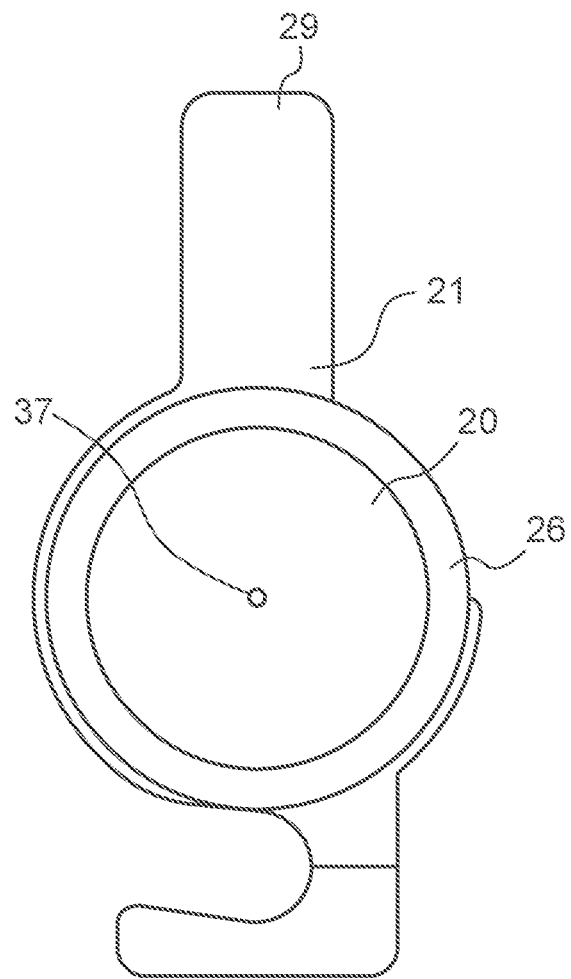
FIG. 6 illustrates a configuration of two components of an exemplary embodiment of the apparatus according to the present invention

FIG. 6, illustrates an exemplary apparatus assembly that includes a shaped portion 21 attached to portion 20 by means of an attachment 37. The apparatus may be gripped by 29 which may be detachable or adjustable. Position change, or movement, of 20, allows 26, the edge of portion 20, to contact a point, surface, face, or feature of the fixed connector characteristic 33, or a point, surface, face, or feature of a changeable connector characteristic 32 (FIG. 9A).

FIG. 7, illustrates an exemplary apparatus assembly, consisting of a shaped portion 21, with a shaped grip 29, a protrusion 24, an area, or gap 25, to allow position change or rotation of portion 20, or edge 26 if a differing design type is utilised, a shaped area 23 to accurately locate, and grip, the pipe 34, connector 33, or connector secondary piece 32 (FIG. 9A), a section of varying thickness or shape 22 and a means of indication 28. Shaped portion 21 is attached to a further shaped portion 20 by means of an attachment 37, shaped portion 20 is marked with connector condition and severity markings 27. The shaped edge area 26 of portion 20 is protected by a protrusion 24. The apparatus 30 may conveniently be realized in the form of a tool, such as a hand-held tool, the apparatus is portable and may be used at a wide variety of different locations to evaluate fitting connector characteristics.

FIG. 8, illustrates an exemplary apparatus assembly 30, with an electronic display attached 31, the electronic display may be permanent, or detachable, the electronic display may also be attached to any portion of the apparatus 30, or form a portion of the apparatus 30, the electronic display may, be remote from the apparatus, connected by cable, or connected by any other connection means known in industry such a Bluetooth for example, apparatus information may be displayed at a later time, by any another means.

FIG. 9A illustrates a pipe 34 inserted into a connector body 33 connected by means of a nut 32.

FIG. 9B illustrates a partial section view of an assembled connector showing the internal features and position/s of pipe 34, connector body 33, nut 32, rear ferrule 35, and front ferrule 36, axial length L1 is indicated.

FIG. 10 illustrates an exemplary apparatus assembly 30, configured to fit, and locate on, a connector assembly, the connector assembly has restrictions such as threads, radiused corners etc 38 which may occur on the fitting body 33, or fitting nut 32, the apparatus is located at a fixed connector characteristic 33 (fitting body), and the apparatus component 20 is moved, and changes position until 26 contacts 32 a changeable characteristic of the connector. The fitting condition and severity may then be determined.

FIG. 10A illustrates an exemplary apparatus assembly 30, positioned on a fitting assembly, the exemplary apparatus assembly 30, has an additional component 42, which may be a display of any type, and allow portion 20 or 26 to change position independently, or may change position with portion 20 or 26.

Figure 10B:
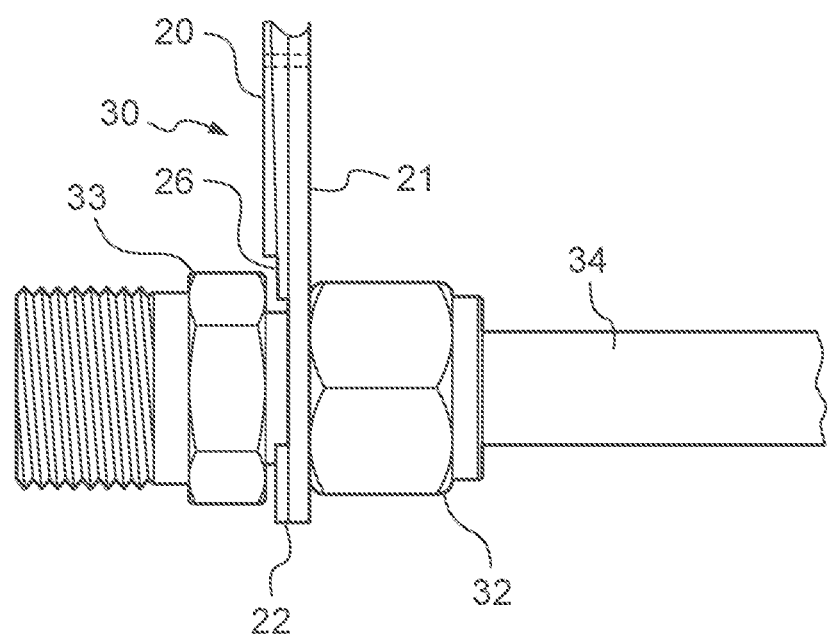
FIG. 10B illustrates an alternative view of an exemplary embodiment of the pipe connector evaluation apparatus, assembled with a pipe connector in an alternative position, according to the present invention.

FIG. 10B illustrates an exemplary apparatus assembly 30, positioned on a fitting assembly, in another possible location, the apparatus is located at a changeable connector characteristic 32 (fitting nut), and the position of apparatus component 20, is changed until 26, contacts a fixed characteristic 33.

Figure 10C:
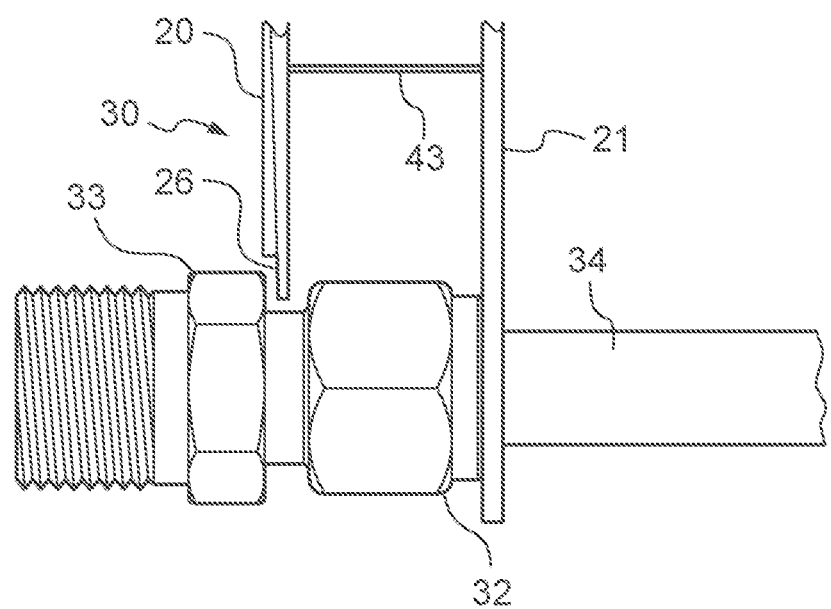
FIG. 10C illustrates an alternative view of an exemplary embodiment of the pipe connector evaluation apparatus, assembled with a pipe connector in an alternative position, according to the present invention.

FIG. 10C illustrates an exemplary apparatus assembly 30, positioned on a fitting assembly, in another possible location, the apparatus is located on a pipe 34, at a changeable characteristic 32, (fitting nut), and the apparatus component position, 20, is moved, until 26, contacts 33 a fixed characteristic.

Figure 10D:
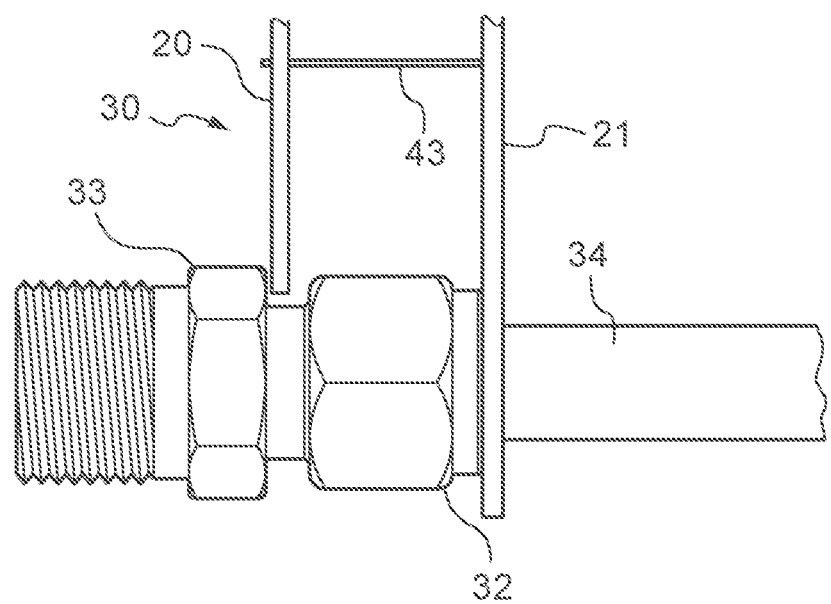
FIG. 10D illustrates an alternative view of an exemplary embodiment of the pipe connector evaluation apparatus, assembled with a pipe connector in an alternative position, according to the present invention.

FIG. 10D illustrates an exemplary apparatus assembly 30, positioned on a fitting assembly, in another possible configuration, the apparatus is located on a pipe 34, at a changeable characteristic 32, (fitting nut), and the apparatus component position 20, is changed, along the axis of 43, until 20, contacts 33 a fixed characteristic.

Figure 10E:
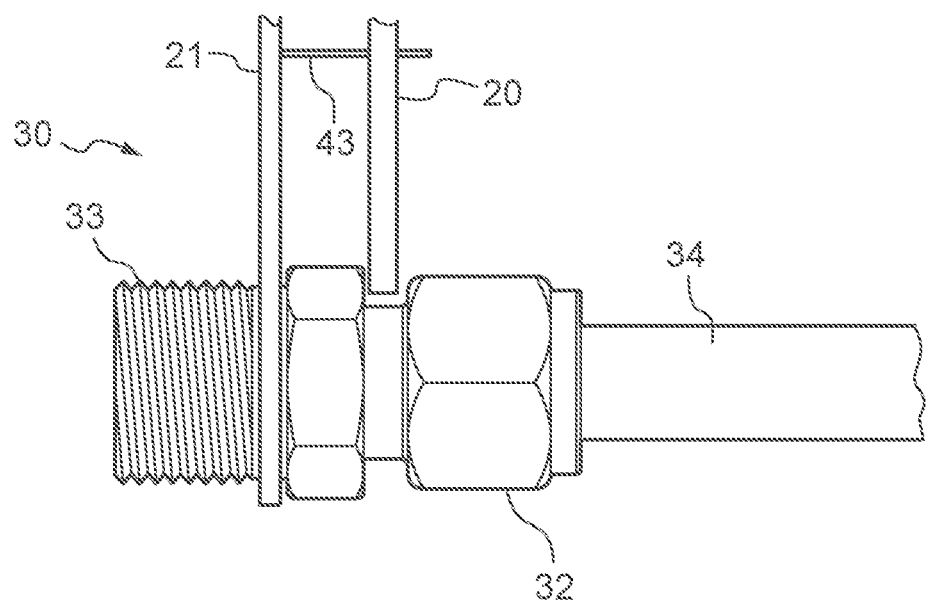
FIG. 10E illustrates an alternative view of an exemplary embodiment of the pipe connector evaluation apparatus, assembled with a pipe connector in an alternative position, according to the present invention.

FIG. 10E illustrates an exemplary apparatus assembly 30, positioned on a fitting assembly, in another possible configuration and location, the apparatus, is located on, a fitting body 33, a fixed connector characteristic, the apparatus component position 20, is moved along the axis of the fitting body, by means of 43, until 20, contacts 32 a changeable connector characteristic.

Figure 10F:
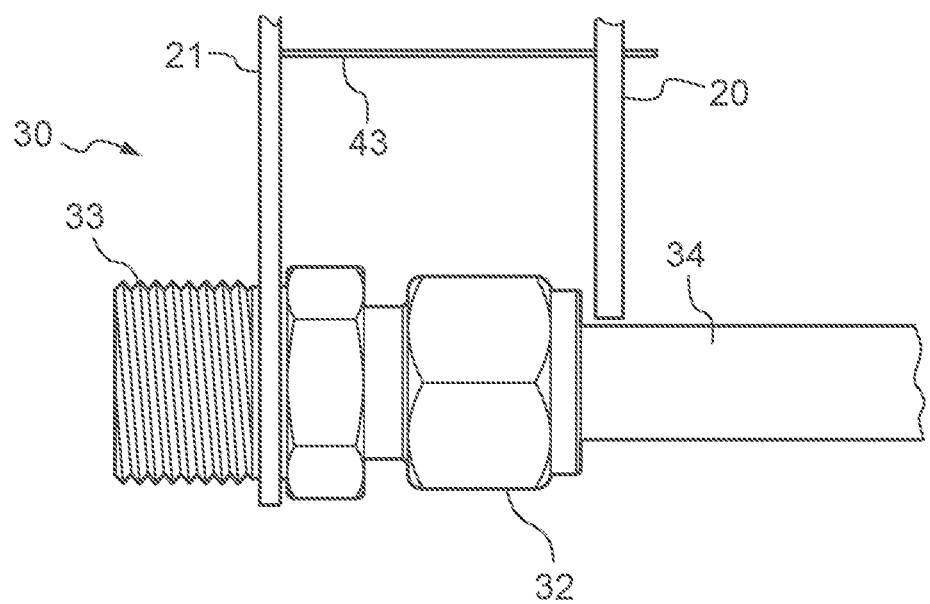
FIG. 10F illustrates an alternative view of an exemplary embodiment of the pipe connector evaluation apparatus, assembled with a pipe connector in an alternative position, according to the present invention.

FIG. 10F illustrates an exemplary apparatus assembly 30, positioned on a fitting assembly, in another possible configuration and location, the apparatus, is located on, a fitting body 33, a fixed connector characteristic, the apparatus component position 20, is moved along the axis of the fitting body, by means of travel along 43, until 20, contacts 32 a changeable connector characteristic.

Figure 11:
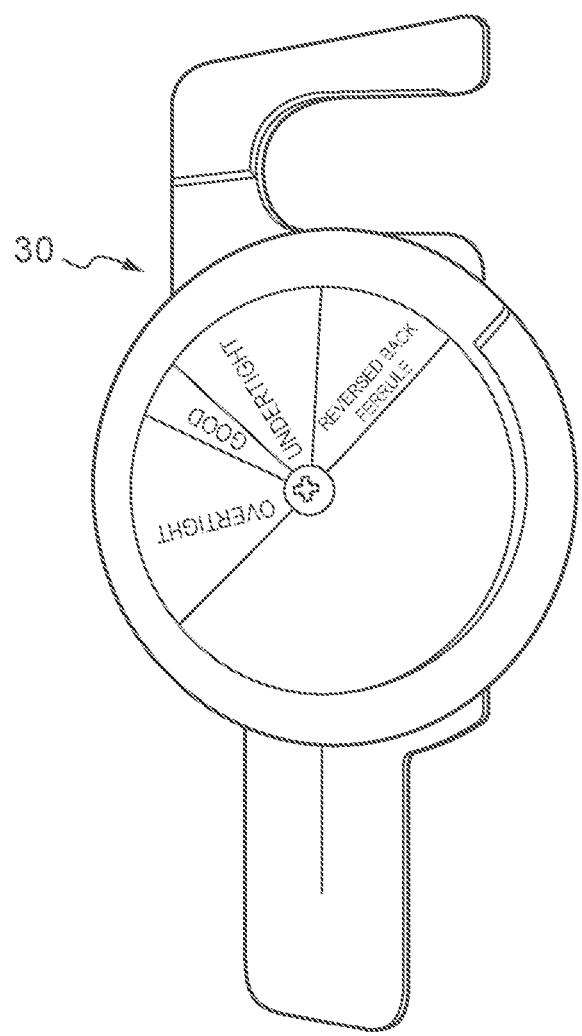
FIG. 11 illustrates an assembled exemplary embodiment of the apparatus according to the present invention.

FIG. 11 illustrates an exemplary apparatus assembly 30.

Figure 12:
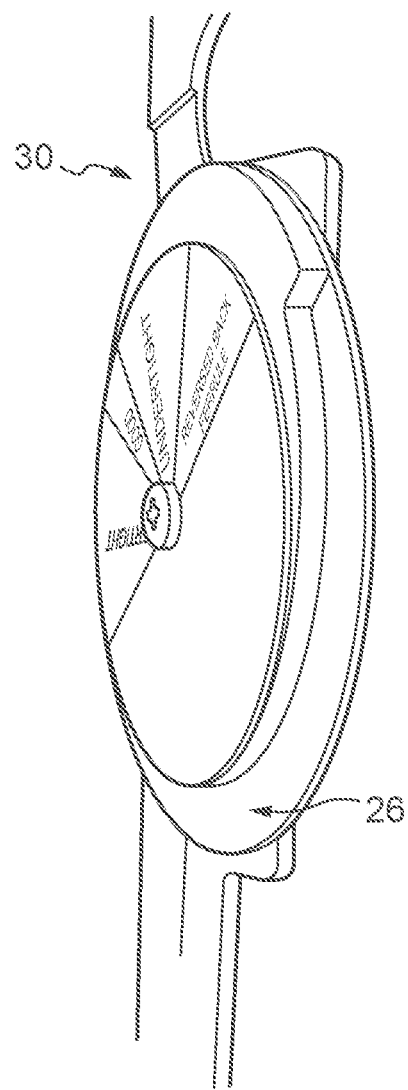
FIG. 12 illustrates a side view of an assembled exemplary embodiment of the apparatus according to the present invention.

FIG. 12 illustrates an exemplary apparatus assembly 30, with a different shape of feature 26.

Figure 13:
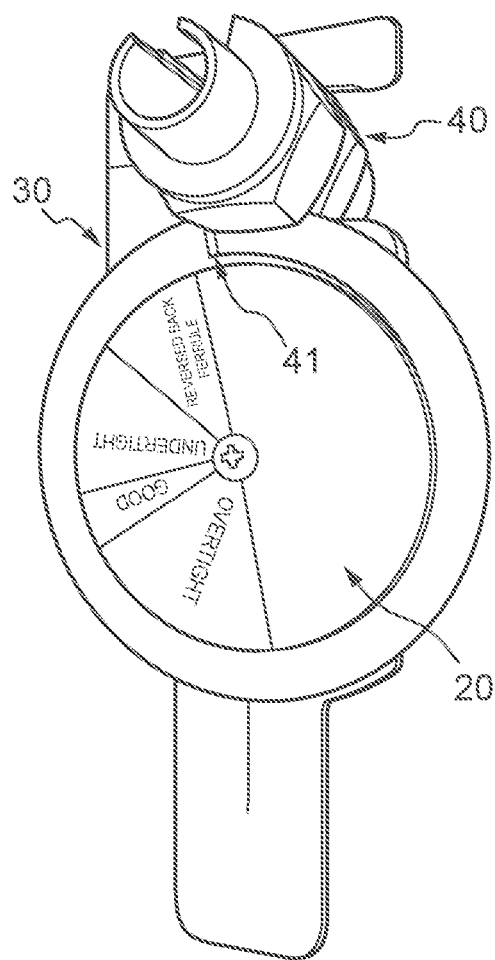
FIG. 13 illustrates a view of an exemplary embodiment of the pipe connector evaluation apparatus, assembled with a reference or calibration pipe connector, according to the present invention.

FIG. 13 illustrates an exemplary apparatus assembly 30, with a stop design 41, the apparatus is located on a calibration or reference piece 40.

FIG. 14 illustrates an exemplary apparatus assembly 30, located on a calibration or reference piece 40, whereas component 21, is located on a fixed characteristic of the connector 33, (a fitting body), component 20 position has changed, relative to component 21 (by rotation for example), component 20, feature 26, has now come into contact with a changeable characteristic 32, of the connector (the fitting nut), the connector condition may now be determined by alignment of condition feature and severity marking/s 27, with indicator mark 28.

FIG. 15 illustrates an exemplary apparatus assembly 30, located upon a connector piece with a different configuration 46, illustrating the apparatus design, to accurately measure, in small areas, which may be restricted, provide a simplified display, and avoid component or access difficulties that would exclude conventional measuring equipment or render conventional measuring equipment inaccurate.

Figure 16:
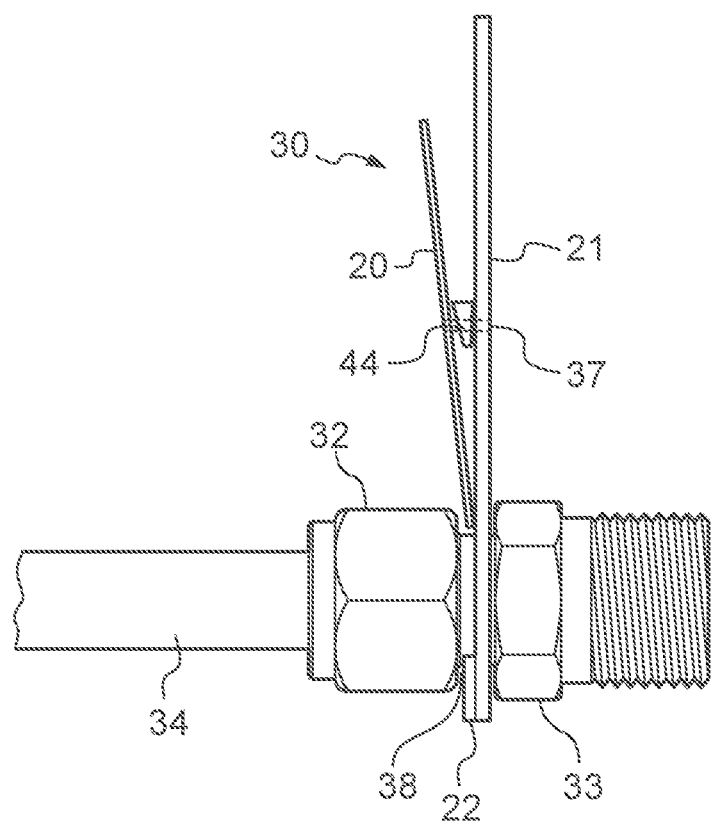
FIG. 16 illustrates an alternative view of an exemplary embodiment of the pipe connector evaluation apparatus, assembled with a pipe connector with an alternative movement method, according to the present invention.
Figure 17:
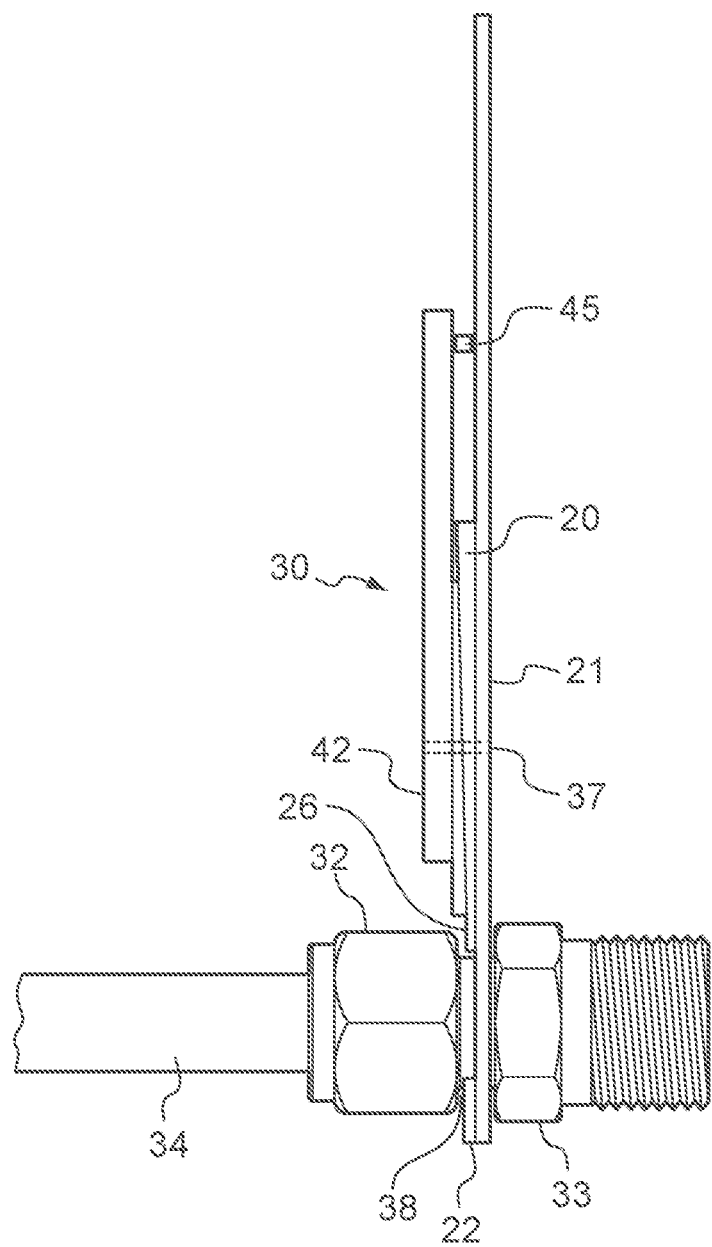
FIG. 17 illustrates an alternative view of an exemplary embodiment of the pipe connector evaluation apparatus, assembled with a pipe connector with a more than two piece design, according to the present invention.

FIG. 16 illustrates an exemplary apparatus assembly 30, positioned on a fitting assembly, in another possible configuration and location, the apparatus, is located on, a fitting body 33, a fixed connector characteristic, the apparatus component 20, position is changed axially along the length of the fitting body by means of attachment to component 44, by changing position, by means of rotation, component 20, contacts 32 a changeable connector characteristic.

FIG. 17 illustrates an exemplary apparatus assembly 30, of more than two pieces, positioned on a fitting assembly, in another possible configuration and location, the apparatus, is located on, a fitting body 33, a fixed connector characteristic, the component 20 possible feature 26, position is changed axially along the length of the fitting body by means of rotation of component 20, component 42 may be a display of any type, and allow 20 or 26 to change position independently, for example, by means of rotation, component 20 or 26, may contact 32 a changeable connector characteristic.

FIG. 18 illustrates an exemplary apparatus assembly apparatus 30, in a two piece assembly, with component 20, connected to a display 31, a second component, by means of an attachment 37. Component 20 position may change relative to display 31. FIG. 18 also illustrates for example only, some alternate configuration types of the apparatus pieces, according to the present invention. It will be appreciated that the apparatus component/s, position/s, may be changed, or varied, by any means, from any point, and may be of any configuration, type, shape, number of pieces, and may be made from any material, by any method known in industry. For example only component 20 may be, a partial circle, or segment shape, which may be moved in arc.

FIG. 19 illustrates an exemplary apparatus assembly 30, of more than two pieces, positioned on a fitting assembly, in another possible configuration and location, the apparatus, is located at a fitting nut 32, a changeable connector characteristic, the apparatus component 20, position is changed axially along the length of the fitting body by means of rotation of component 20, component 31, in this example, is an electronic display, which in this example, is supplying an indication of rotation angle, however 31 may be a display of any type, of any feature, or condition, or condition severity, component 29 is a gripping piece which may be, of any shape, and may be detachable.

Figure 20:
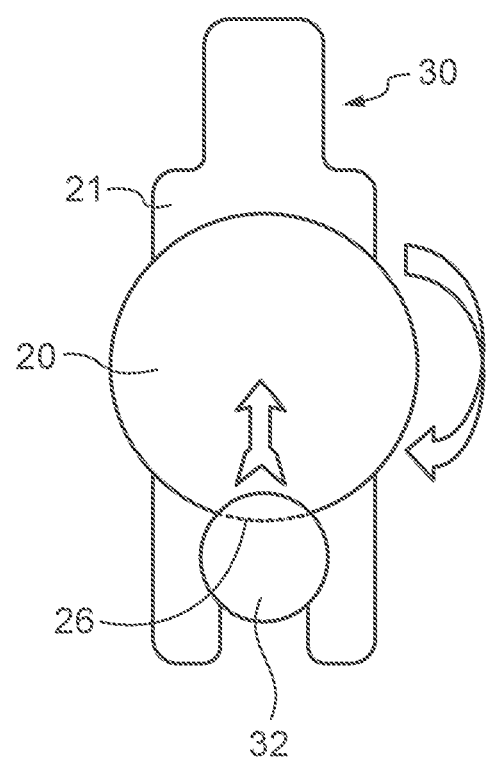
FIG. 20 illustrates forces created during use of the device.

FIG. 20 illustrates an example exemplary apparatus assembly 30, showing the force direction when the apparatus 30 design is used.

Figure 21:
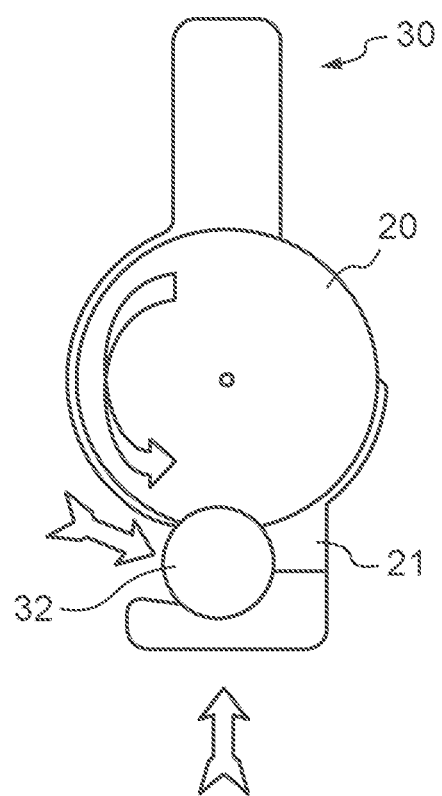
FIG. 21 illustrates an alternative device design using the forces created to aid the inspection/evaluation.

FIG. 21 illustrates an example exemplary apparatus assembly 30, of a differing design, showing the forces created that are used to aid placement and accuracy of the exemplary apparatus assembly 30

Figure 22:
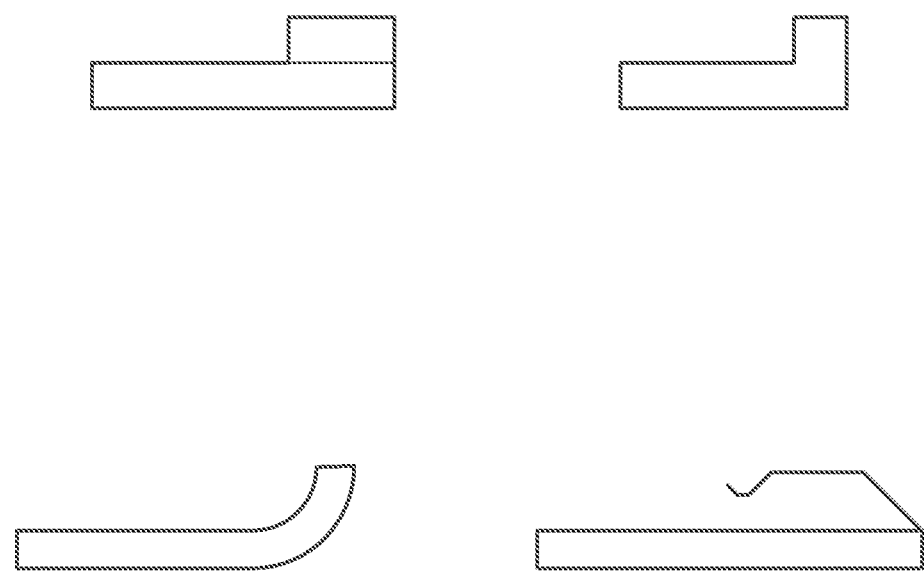
FIG. 22 illustrates alternative shapes or additional pieces of device component.

FIG. 22 illustrates example, possible shapes and configuration of component 22.

Figure 23:
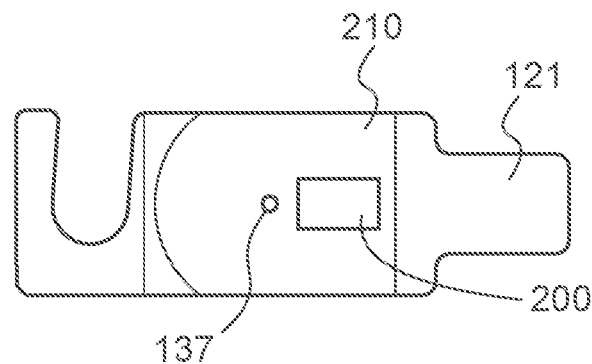
FIG. 23 illustrates a disassembled variation of the tool whereby NFC tags are attached circumferentially around the second component's central axis; a front sub-component of the first component is provided with an RF signal blocking material defining an aperture for RF signal transmission; and a rear sub-component of the first component is also provided an RF signal blocking material defining an aperture for RF signal transmission.
Figure 23:
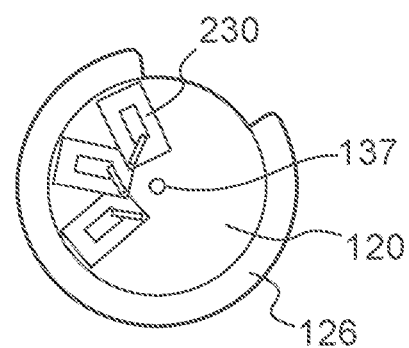
Figure 23:
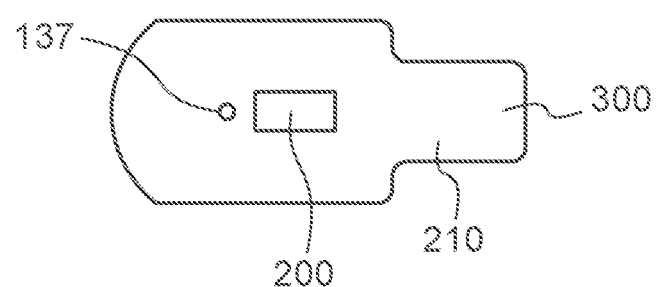

FIG. 23 illustrates a disassembled variation of the tool whereby a front sub-component 121 of the first component is covered by a RF signal blocking material such as foil 210. The foil 210 has an aperture or window 200 formed therein. In the illustrated example, the aperture 200 is rectangular in shape and located proximate the connection axis 137. The second component 120 comprises a series of RFID tags 230 attached thereto at locations corresponding to different predetermined connection conditions, as explained below. The RFID tags 230 are distributed circumferentially around the connection axis 137 at a radial position lying inwardly of its peripheral edge portion 126. A rear sub-component 300 of the first component is also covered by a RF signal blocking foil 210 having a rectangular aperture 200 formed therein proximate a connection axis 137.

Figure 24:
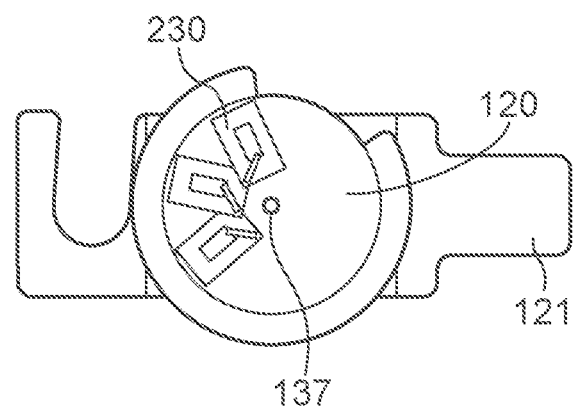
FIG. 24 illustrates a partially assembled version of the tool variation whereby the second component is attached to the front sub-component about the rotation axis to thereby align the circumferential travel path of the NFC tags with the aperture.
Figure 24:
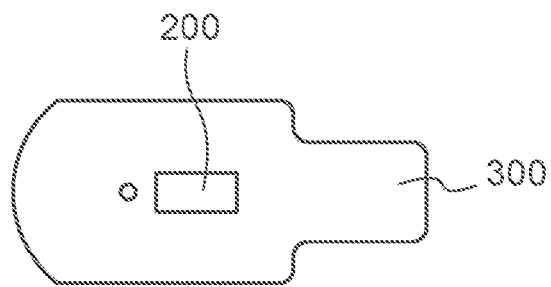

FIG. 24 illustrates the parts described above in relation to FIG. 23 in a partially assembled condition whereby the second component 120 is attached to the front sub-component 121 at the connection axis 137 such that the RFID tags 230 face toward, and are rotationally alignable with, the rectangular aperture 200 formed within the foil 210.

Figure 25:
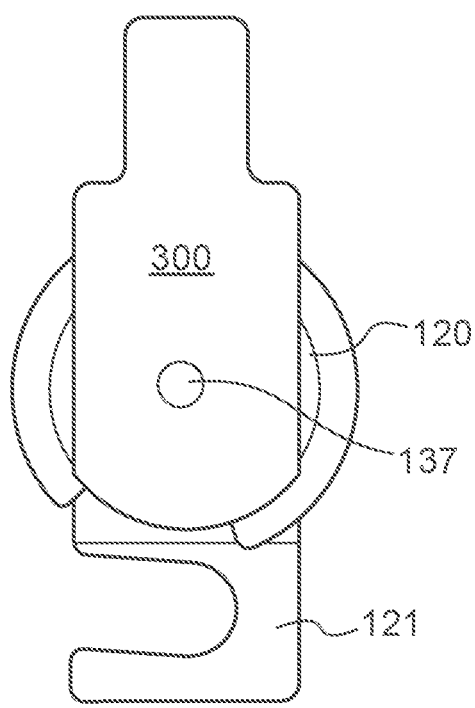
FIG. 25 illustrates a fully assembled version of the tool variation whereby the rear sub-component is attached to the front sub-component about the rotation axis to thereby sandwich the second component between the two and align the respective apertures.
Figure 26:
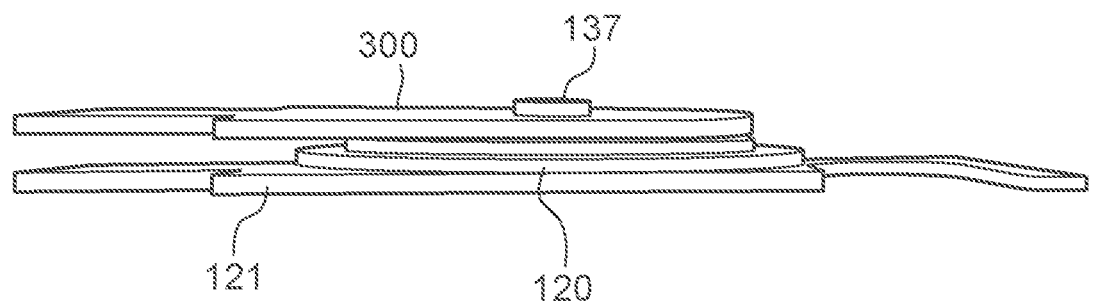
FIG. 26 is a side view of the fully assembled version of the tool shown in FIG. 25.

FIG. 25 illustrates the parts described above in relation to FIGS. 23 and 24 in their fully assembled condition whereby the rear sub-component 300 is connected to front sub-component 121 at the connection axis 137 to thereby sandwich (see FIG. 26) the second component 120 between the two sub-components 121, 300. In doing so, the respective apertures 200 within the foil 210 on each sub-component 121, 300 are aligned in the axial direction; and the foil-covered surfaces 210 face toward one another.

It will be appreciated that the front and rear sub-components 121, 300 may be provided with physical apertures to allow transmission of RF signals. For example, this would be necessary if the front and rear sub-components 121, 300 were to be formed of a material—such as metal—that inherently blocks RF signals. In such a circumstance, the physical aperture may be filled with a physical barrier material to protect the underlying RFID tags; however the physical barrier material would permit RF signal transmission.

One or both of the fitting body, nut and any other components may be replaced by another fitting body and/or nut or any other components when the pipe is assembled. Threaded components may include, for example, the body and nut of a fitting. It should be noted that many of the inventive aspects described herein may also be applied to any other pipe connectors involving, for example, clamping and/or compressing components (as opposed to threaded components), other manually installed apparatus, or compressing of a pipe connector by pull-up of a fitting. The present apparatus, method and display contemplates evaluation, verification, or inspection of an installed pipe connector on a pipe after the pipe connector is installed on the pipe. The evaluation, verification, or inspection may occur after the assembly has been completed and the installed pipe connector is in service or has been in service for a period of time, at any location.

The present apparatus may be used to evaluate, verify, and inspect, installed connectors, and/or to verify installer competence.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, apparatus and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein.

Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming a portion of an invention, such identification is not intended to be exclusive, but rather there may be inventive aspects, concepts and features that are fully described herein without being expressly identified as such or as portion of a specific invention. Descriptions of exemplary methods or processes are not limited to inclusion of all steps as being required in all cases, nor is the order that the steps are presented to be construed as required or necessary unless expressly so stated.

The exemplary apparatus 30 may include a, fitting condition reference feature shown at 27. According to an inventive aspect of the present application, the fitting condition reference feature 27 may be positioned such that the fitting condition reference feature 27 corresponds to a position, or rotation angle or distance (or range of angles or distances) that the apparatus 30 component/s has changed position, or has been rotated, or moved between a moveable connector characteristic 32, and a fixed connector characteristic 33, on the fitting, which will correspond to a length or lengths along axis L1 (FIG. 9A). The position/s of the fitting condition reference feature 27 may be pre-determined prior to use of the apparatus 30 using calibration or reference piece/s. The fitting condition may also be displayed electronically 31, 42. The axial distance or range of distances L1 may correspond to acceptable or unacceptable fitting conditions as determined by calibration or reference pieces/s. The apparatus portion 20 may take a wide variety of different forms, and for example, may include a stop, a tapered surface, and may be fixed or moveable between a predetermined range of position/s. In one exemplary embodiment, the portion 20 is a unitary structure that includes both the contact feature 26 and the condition reference feature 27.

The condition reference feature 27, may be detachable and/or replaceable, and may be provided in many different forms, configurations, and may provide for many different types of evaluation, verification, or inspection of axial position, L1. As one example, the condition reference feature 27 may include a visible marking, projection or other such feature that provides a visible indication of the condition of the fitting, when aligned with the indication or indicator 28 (FIG. 7), allows the user to visually determine the fitting assembly condition.

As still another example, the apparatus 30 may include a mechanical or electrical gauging mechanism, such as, for example, an electrical switch, sensor, or other such electrical mechanism that generates an electrical signal to provide an indication of the condition of the fitting assembly. The apparatus 30, may be configured to generate an electrical signal that indicates the position, or rotation angle, or dimension, of component 20, or any component of the apparatus 30, which corresponds to the axial position, L1 of the fitting assembly. Any electronic, mechanical or any other type of interface or connection as known by industry to measure, position, or rotation angle, or dimension for example may be used to determine or measure the position, of component 20, or any other apparatus component, in relation to component 21, or any other apparatus component, a visible or audible indication of the position, based on the information received may be provided. The information received may also be in electronic form. For example analogue sensors, digital sensors that provide outputs at predetermined displacement intervals and/or time intervals, and multiple discrete switches arranged to sense multiple position/s of any apparatus component, with respect to any another component, or with respect to any electronic apparatus used may be considered to be sensors. Any type of sensor capable of changing states when an apparatus component changes position or reaches a predetermined position, relative to any another component of the apparatus, including a display, or any other, connected, component for example, a position, or rotation counter may be used. Any type of sensor that is capable of changing states when a component changes position, for example, pre-determined angle, dimension or position, may be used. For example a linear variable displacement transducer may be used, analogue sensors, digital sensors that provide outputs at predetermined displacement intervals and/or time intervals, and multiple discrete switches arranged to sense multiple position/s of the apparatus components may be used.

The output apparatus used may take a wide variety of different forms. The output apparatus may be a single apparatus that outputs a signal. The output signal/s may take any form/s. The output signal(s) may be for example, digital, visual, audible or any signals that indicate to a user of the apparatus whether or not the fitting has been correctly assembled. The output signal(s) may be wired or wireless signals.

The invention has been described with reference to the preferred embodiments. Modifications and alterations will occur to others upon a reading and understanding of this document. It is intended to include all such modifications and alterations insofar as they come within the scope of this document.

Modifications and improvements may be incorporated herein without departing from the scope of the invention.

Summary of Invention Advantages and Use

It will be appreciated that the apparatus may take many multiple forms and designs as described elsewhere within this document, for example only, and explanation of some features only, a description is provided of the apparatus 30, shown in FIG. 7, which may be placed on the fitting 33 in the position shown in FIG. 10. Further detailed information can be found within this document and the attached figures.

The apparatus 30, may be placed onto the fitting body 33, aside the fitting nut 32, as shown in (FIG. 10) by means of the slot 23 in the apparatus (FIG. 7). The edge 26, of the circular shape 20, is now in the space as shown in FIG. 10. Upon rotation of 20, the face 26, starts to contact the required measurement area, on the fitting nut, as 26 has an increasing thickness upon rotation. The apparatus is moved into the correct position as described below, until 20 may not be rotated further, and face 26 is now in contact with the fitting nut, at this point, the pre-set display 27, aligns with the fitting condition indicator mark 28, the fitting condition may now be read from the display. The various fitting conditions and display have already been pre-set by using known values. Upon reading the condition, the user, then rotates 20, in the opposite direction to release the apparatus, which may then be removed. (information as to how the apparatus may indicate fitting condition by measuring very accurately the length of L1 FIG. 9B has already been described above).

Description of Actions which May Occur During Use:

Referring to FIG. 7, the portion 21, has a shape 23, a slot, which allows easy location, and contact, with the fitting body. A slot, in this example, allows the apparatus to locate on the fitting quickly, accurately, tightly, and with minimum movement, during inspection. The user may slightly misalign the apparatus upon initial placement, the slot corners being shaped, or rounded, allows a wider gape at the outer edge of the slot, which narrows, as the slot deepens further. Upon initial placement of the apparatus, the fitting is initially at the wider end of the slot, and as the apparatus is placed further onto the fitting, it is guided into the narrower slot area, where it is more firmly held. The slot also has a chamfered area, around the slot periphery (FIG. 4A), to allow portion 21, to be placed against the face of the fitting body 33 (FIG. 10), without portion 21, contacting any threads, radiused corners etc which could interfere with the apparatus, and give a false reading.

During use, the component 20, is rotated and may create a force, at the point where the edge 26, of component 20, contacts the measurement face of nut 32 (FIG. 20). The force may cause the apparatus to push out of the fitting, and/or the apparatus position to change, or come off, the measurement face (indicated by the upwards arrow in FIG. 20), leading to a false reading, or the user being unable to obtain a reading. In FIG. 7, the slot design is shown at approximately ninety five degrees to the FIG. 20 design (other angles may be used). The force created, that tries to push the apparatus away from the measurement area, as per the FIG. 20 design, may not now force the apparatus away. The slot design now uses the force created, to pull the opposite end of the slot, tighter onto the fitting body (indicated by the upwards arrow in FIG. 21), furthermore the force created, as 20 is rotated, in the direction of the slot bottom (in this case anti-clockwise), and starts to contact the fitting nut face, is now used to guide and force the apparatus further into the fitting, (indicated by the rightwards pointing arrow positioned at the slot FIG. 21) when 20 stops and may not be rotated any further, the apparatus is now positioned, with the fitting at the back of the slot, being held firmly in the correct position for measurement, also the face 26, and portion 21, (FIG. 10) are now also held firmly, in the correct positions, for measurement, the angled slot design as shown in FIG. 7, ensures that any force created during use of the apparatus, is used to ensure the fitting, is positioned to the back of the slot, and the apparatus is held and/or 'locked', firmly in place, on the fitting, thus ensuring the fitting is held tightly, in the correct position, at the correct angle for measurement, allowing a highly accurate measurement and overcoming some of the conventional measurement equipment issues.

Component 21, also has a thicker shaped section 22, shown in FIG. 7 and in FIG. 10, the thicker section is designed to fill more completely the area between the fitting body, and fitting nut, to further reduce any apparatus movement during use. Section 22 may be any shape, any may take any form, for example, if the material used for component 21, is malleable, such as some metals, then 22, may take the form of a bent, or twisted edge, to again fill more completely the area. Alternatively 22 may be, an additional piece, such as a spring leaf, or clip, such that when the apparatus is inserted onto the fitting body, the spring leaf is contacted, and holds the apparatus steady (FIG. 22 shows some example shapes or configurations of section or piece 22).

Referring to FIG. 7, component 21, has a partial protection lip 24, around some of the periphery, to protect the edge 26, of the circular component 20, from accidental damage. The edge 26, if damaged, could give false readings, or render the apparatus unusable. The protection lip is not present in the slot area 23, as this would interfere with the apparatus operation, the slot design provides protection in this area. The protection lip is also not present in area 25, to allow the user to rotate the circular shape 20, by hand. Although the edge 26, is not protected by the lip at area 25, the grip design 29, is long enough, such that if dropped accidently in this area, the grip design, along with the partial lip area, will contact any surface, before the exposed edge 26, this design offers some protection to the edge 26, from damage, such as dropping the apparatus etc.

The apparatus also has a gripping shape 29, for the user to grip the apparatus. 29 may be detachable, or adjustable, to allow the apparatus to access tight, or restricted areas.

The component 21, has an indicator 28, which indicates relevant information, when the apparatus is in use.

Referring to FIG. 7, component 20, is attached to component 21, by means of an attachment 37. Component 20 has a pre-determined diameter. The contact areas, on the fitting nut, and fitting body, may be very small areas, which are offset to each other, therefore the circular component 20 diameter, has been pre-determined, to only allow contact in the area required, and not contact any threads, or radiused corners etc. which could interfere, or give a false reading. (Refer to FIG. 9B cross section to view contact face required on fitting nut and threads and corners which could give a false reading for this particular type of connector). FIG. 15 shows a different configuration connector with very small contact faces on the fitting body, offset to the contact faces on the fitting nut. Component 20 may also have a stop 41, (FIG. 2A, FIG. 13), after use, the user will rotate component 20 until the stop is reached, the component 20, may not then be physically be rotated any further, the stop now indicates to the user, that the thinnest edge of the component 20, is at the position where the apparatus may be easily removed, and/or replaced, onto another fitting. The stop may also serve, as a reference or 'zero' point, when setting a digital display. Referring to FIG. 2A and FIG. 10, component 20 may also, have an edge 26, which changes position, upon rotation, allowing the edge of component 20, to contact the fitting nut, in this example, a shape such as FIG. 2A is used (many shapes may also cause 20 to change position, 20 may also change position by means of another method, and may also have no change of shape at the edge). When component 20 is rotated, the position of edge 26, comes into contact with the fitting nut face, and may be moved no further, at this point, the fitting condition information, may be read from the marked areas, 27, on the face of 20, which align with, 28 on component 21 (Refer to FIG. 7 and FIG. 14). Due to difficulty in reading any markings or indications at the actual area where 26 contacts the fitting nut, the indication and display are placed at any area on the apparatus, which is easier for the user to read, in this case, opposite the contact area.

The marked areas 27 in FIG. 14, indicate fitting condition, the marking and/or indications may indicate any information gained from using the apparatus, for example, the dimension of the gap, the thickness of the apparatus in the contact area, the position change of any piece, the rotation angle, the movement, or dimension change of any component of the apparatus.

With respect to the variation of the apparatus shown in FIGS. 23 to 26, it will be appreciated that a measurement and/or an indication of one or more predetermined connection conditions may be read remotely from the tool on an electronic device such a mobile telephone. In use, the operation of the tool is no different than that already described above insofar as the second component 120 is rotated until its peripheral surface, and a surface of the first component 121 contact against respective surfaces of fixed and adjustable fitting parts of a mechanical joint or pipe fitting to be evaluated.

However, rather than providing marked indicia 27 on the tool itself as shown in FIG. 14, the relevant information is readable via the remote electronic device by means of contactless communication technology, such as near-field communication (NFC) or radio-frequency identification (RFID) technology. For example, each radio-frequency (RF) target in the form of RFID tags 230 provided on the second component is either concealed behind the opposing foil surfaces 210, or is visible within the apertures 200. An RF initiator in the form of a mobile telephone is capable only of detecting any RF target which is exposed within the aligned apertures 200. Any other RF targets are blocked by virtue of being sandwiched between the opposing foil surfaces 210. It will therefore be appreciated that each RF target RFID tag can be individually programmed to hold information representative of a measurement and/or a predetermined connection condition correlating to its circumferential position on the second component when the first and second components each establish contact with surfaces of fixed and adjustable fitting parts of the fitting.

Advantages

Conventional measuring equipment would normally contact and measure across the faces, with a very small contact point, the conventional measuring equipment is not accurate enough, difficult and/or impossible to get into the small areas to be measured, to position at the correct points, (which may be offset), to avoid any threads or radiused corners etc, and for the user to hold the measuring equipment, exactly square and steady to the measurement points during measurement, to determine very small tolerances (in some cases 0.08 mm—the width of a sheet of paper is the tolerance band), accurate reliable, repeatable, measurement has proved impossible. The measurement may also be taking place in a field environment, outdoors at heights in restricted areas with restricted movement, tight positions, limited access for the user and any measuring equipment etc. The invention apparatus contacts along the faces to be measured, rather than across the faces as per conventional measuring equipment. This has a number of advantages, for example, with the contact area being along the faces, when using the apparatus, as the apparatus components come into contact with the measurement faces to be measured, the force during use, positions and holds the apparatus at the correct angle, in the correct position, for measurement. The greater contact area allows the apparatus to more accurately measure, as the measurement is taken from a larger surface area averaging any small differences, the rotational force applied to the apparatus during measurement allows the components better contact, if a conventional apparatus was used a greater force leads to errors (as previously described above). Furthermore the apparatus when used actually locks and holds in the correct position, at the correct angle for measurement, with the fitting condition displayed. The user may let go of the apparatus and the apparatus will stay in this position, this may allow the user to fit the apparatus by hand into tight or restricted spaces, even when the apparatus is not visible and then change position to view the apparatus display which may be visible from a different position. The apparatus allows accurate, reliable, repeatable measurements to determine connector condition which has previously proved impossible.

The apparatus may also measure for example, position change, rotation angle, the circumferential position and/or distance moved by component 20 or any other position change. By using the rotation angle, or the circumference, the apparatus is more sensitive than conventional measuring equipment, to the very small dimensional changes and tolerances that may occur, due to the differing fitting conditions. (as previously described above).

The apparatus components may also be changed to alter sensitivity, including changing shape, or thickness for example (as previously described above), this means that any condition required to be determined, may have a differing sensitivity and tolerance, and/or a differing display area, all set on the same apparatus component if required.

The apparatus display also reduces human factor errors, which are a major contributor to incorrectly made fitting assemblies, and also reduces human inputs and the number of steps required in the inspection process (as previously described above).

With respect to the variation of the apparatus shown in FIGS. 23 to 26, it will be appreciated that the use of near-field communication (NFC) obviates the need for any power supply or batteries within the tool itself which advantageously obviates the need for certain associated regulatory approvals. Reading information remotely on, for example, a mobile telephone may be particularly advantageous if the tool is used within restricted spaces. The information is easy to read and thus human error and discomfort is eliminated or at least reduced. Use of an electronic device also facilitates easy transfer of information between devices and/or upload to a server or database for further analysis or processing.

The invention claimed is:

1. A tool for evaluating a connection condition of a mechanical fitting of a fitting assembly, the tool comprising:
 (i) a first component shaped to facilitate its engagement with the fitting assembly to be evaluated, wherein the first component comprises a recess for facilitating engagement of the first component at least partially around the fitting assembly; and
 (ii) a second component rotatably connected to, and moveable relative to, the first component about a rotation axis;
 wherein a relative rotation between the first and second components establishes a measurement configuration of the tool in which the first component contacts a first surface of the fitting assembly and the second component contacts a second surface of the fitting assembly to be evaluated, said measurement configuration being directly or indirectly indicative of one or more predetermined connection conditions of the fitting assembly.

2. A tool according to claim 1, wherein at least one of:
 i. wherein the recess progressively widens towards its opening; or
 ii. wherein the recess is provided with chamfered edges.

3. A tool according to claim 1, wherein one of:
 i. the first component has a maximum length along a longitudinal axis which is longer than its maximum width along a width-wise axis, wherein said recess extends generally width-wise proximate one end of the first component; or
 ii. the first component has a maximum length along a longitudinal axis which is longer than its maximum width along a width-wise axis, wherein said recess extends generally width-wise proximate one end of the first component, and wherein a central axis of the recess extends away from the first component at an angle of greater than 0 degrees relative to said width-wise axis of the first component.

4. A tool according to claim 1, wherein the rotation axis is positioned substantially centrally on the first component.

5. A tool according to claim 1, wherein the second component is, at least in part, in the form of a disc.

6. A tool according to claim 1, wherein at least part of a peripheral edge portion of the second component coincides with at least part of a peripheral edge of the first component.

7. A tool according to claim 1, wherein one of:
   i. at least part of a peripheral edge portion of the first component defines a protective lip for the second component by extending beyond a peripheral edge portion of the second component; or
   ii. at least part of a peripheral edge portion of the first component defines a protective lip for the second component by extending beyond a peripheral edge portion of the second component, and wherein said protective lip is absent at one or more circumferential portions around the first component to facilitate manual movement of the second component relative to the first component.

8. A tool according to claim 1, wherein one of:
   i. at least part of a peripheral edge portion of the second component has a thickness in an axial direction which varies progressively around its circumference; or
   ii. at least part of a peripheral edge portion of the second component has a thickness in the axial direction which varies progressively around its circumference, and wherein a reference surface is defined on the second component at a circumferential meeting point between a minimum and a maximum thicknesses of the peripheral edge portion of the second component.

9. A tool according to claim 1, wherein a thickness of the first component distal to its shaped portion is relatively greater than the thickness of other parts of the first component.

10. A tool according to claim 1, wherein one of:
    i. one of the first component and the second component comprises a reference feature, and visually perceptible indicia are provided on the other of the first component and the second component for alignment with the reference feature-so as to indicate said one or more connection conditions; or
    ii. one of the first component and the second component comprises a reference feature, and visually perceptible indicia are provided on the other of the first component and the second component for alignment with the reference feature so as to indicate said one or more connection conditions, and wherein said reference feature is located at a position remote from a point of engagement with the fitting assembly to be evaluated.

11. A tool according to claim 1, configured for pairing to a remote electronic device, wherein said measurement and/or said one or more predetermined connection conditions of the fitting assembly is readable on said remote electronic device.

12. A tool according to claim 11, wherein a plurality of contactless communication targets is connected to, and movable with, the second component; said targets being individually readable via the remote electronic device.

13. A tool according to claim 12, wherein the second component is in the form of a rotatable disc and the targets are arranged circumferentially thereon/therein at positions which correlate with differing predetermined connection conditions of a fitting as the disc is rotated relative to the first component.

14. A tool according to claim 13, wherein at least one of:
    i. a physical or virtual aperture is provided in the first component such that, when a near-field communication (NFC) or radio-frequency identification (RFID) target is aligned therewith a radio frequency (RF) or magnetic field can be established between it and a remote radio-frequency (RF) or magnetic field initiator,
    ii. a physical or virtual aperture is provided in the first component such that, when a near-field communication (NFC) or radio-frequency identification (RFID) target is aligned therewith a radio frequency (RF) or magnetic field can be established between it and a remote radio-frequency (RF) or magnetic field initiator, and wherein the aperture is defined by an RF or magnetic field blocking material provided on and/or in the first component; or
    iii. a physical or virtual aperture is provided in the first component such that, when a near-field communication (NFC) or radio-frequency identification (RFID) target is aligned therewith a radio frequency (RF) or magnetic field can be established between it and a remote radio-frequency (RF) or magnetic field initiator, and wherein the aperture is defined by an RF or magnetic field blocking material provided in the first component.

15. A tool according to claim 14, wherein one of:
    i. the first component is formed from front and rear sub-components, and wherein the rotatable disc and its associated targets are sandwiched between the two; or
    ii. the first component is formed from front and rear sub-components, and wherein the rotatable disc and its associated targets are sandwiched between the two, and wherein the front and rear sub-components are each provided with said physical or virtual apertures and an RF or magnetic field blocking material.

16. A method of evaluating the connection condition of a fitting comprising:
    (i) providing a tool in accordance with claim 1;
    (ii) engaging the first component with the fitting assembly to be evaluated proximate the first and second surfaces thereof;
    (iii) effecting relative movement between the first and second components until respective surfaces thereof each contact the first and second surfaces; and
    (iv) establishing a measurement between said first and second surfaces;
    wherein said measurement is directly or indirectly indicative of the one or more predetermined connection conditions.

17. A method according to claim 16, wherein said measurement is indicative of one or more predetermined connection conditions selected from the list comprising:
    (i) over-tightened fastener;
    (ii) under-tightened fastener;
    (iii) incorrect fastener type;
    (iv) incorrect fastener shape;
    (v) incorrect fastener size;
    (vi) incorrect internal or external components;
    (vii) mixed fastener components from differing manufacturers;
    (viii) more or less fastener components than an optimum number;
    (ix) incorrect positioning of internal or external fastener components;
    (x) presence of mixed imperial and metric fasteners;

(xi) fastener movement over time; or
(vii) incorrect fastener angle.

18. A method according to claim 16, wherein one of said first component and said second component is provided with visually perceptible indicia and other of said first component and said second component comprises a reference feature, the method comprised discerning said measurement and/or associated one or more predetermined connection conditions of the fitting assembly by virtue of alignment of said indicia with said reference feature.

19. A method according to claim 16, wherein at least one of:
   i. said tool is paired to a remote electronic device and the method comprises reading said measurement and/or one or more associated predetermined connection conditions of the fitting assembly on said remote electronic device;
   ii. said tool is paired to a remote electronic device and the method comprises reading and storing said measurement and/or one or more associated predetermined connection conditions of the fitting assembly on said remote electronic device;
   iii. said tool is paired to a remote electronic device and the method comprises reading said measurement and/or one or more associated predetermined connection conditions of the fitting assembly on said remote electronic device and uploading to a database for processing; or
   iv. said tool is paired to a remote electronic device and the method comprises reading said measurement and/or one or more associated predetermined connection conditions of the fitting assembly on said remote electronic device and uploading to a database for comparison against acceptable tolerance values.

20. The method according to claim 16, wherein the measurement is any one of: rotation angle, circumferential distance, or arc length traveled by the second component relative to the first component.

21. A tool according to claim 1 configured to provide said measurement as an input to a database for subsequently providing said one or more predetermined connection conditions as an output.

22. A tool according to claim 1, wherein the tool is configured to measure any one of: rotation angle, circumferential distance, or arc length traveled by the second component relative to the first component at the measurement configuration.

23. A tool according to claim 1, wherein at least part of a fitting contact portion of the second component contacts the fitting surface at an angle.

24. A tool according to claim 1, further comprising:
   an electronic display for indicating the one or more connection conditions.

25. A tool for evaluating a connection condition of a mechanical fitting comprising:
   (i) a first component shaped to facilitate its engagement with a fitting to be evaluated, wherein the first component comprises a recess for facilitating its engagement at least partially around the fitting to be evaluated, wherein the recess progressively widens towards its opening; and
   (ii) a second component connected to, and moveable relative to, the first component,
   wherein a relative movement between the first and second components establishes a measurement between two surfaces of a fitting to be evaluated, said measurement being directly or indirectly indicative of one or more predetermined connection conditions.

* * * * *